United States Patent
Chu et al.

(10) Patent No.: US 10,602,430 B2
(45) Date of Patent: *Mar. 24, 2020

(54) MULTIPLE BASIC SERVICE SET SUPPORT

(71) Applicant: Marvell World Trade Ltd., St. Michael (BB)

(72) Inventors: Liwen Chu, San Ramon, CA (US); Lei Wang, San Diego, CA (US); Jinjing Jiang, San Jose, CA (US); Hongyuan Zhang, Fremont, CA (US); Yakun Sun, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/247,451

(22) Filed: Jan. 14, 2019

(65) Prior Publication Data
US 2019/0150063 A1 May 16, 2019

Related U.S. Application Data

(63) Continuation-in-part of application No. 15/438,732, filed on Feb. 21, 2017, now Pat. No. 10,237,891.
(Continued)

(51) Int. Cl.
*H04W 48/08* (2009.01)
*H04L 29/08* (2006.01)
(Continued)

(52) U.S. Cl.
CPC ............. *H04W 48/08* (2013.01); *H04L 69/22* (2013.01); *H04L 69/324* (2013.01);
(Continued)

(58) Field of Classification Search
CPC ..... H04W 48/02; H04W 48/08; H04W 48/16; H04W 80/02; H04W 84/12; H04W 88/08;
(Continued)

(56) References Cited

U.S. PATENT DOCUMENTS 9,860,785 B2 * 1/2018 Asterjadhi ............ H04W 28/06
10,237,891 B1 3/2019 Chu et al.
(Continued)

FOREIGN PATENT DOCUMENTS

WO WO-2017/099542 A1 6/2017

OTHER PUBLICATIONS

IEEE Std 802.11™ 2012 (Revision of IEEE Std 802.Nov. 2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).
(Continued)

*Primary Examiner* — Candal Elpenord

(57) ABSTRACT

An access point (AP) device determines a set of basic service set identifiers (BSSIDs). Each BSSID includes a same group of most significant bits (MSBs) and a different group of n least significant bits (LSBs). The AP device assigns respective BSSIDs from the set of BSSIDs to multiple virtual APs, and designates one of the assigned BSSIDs as a reference BSSID that corresponds to a transmitter address (TA) for frames intended for client stations associated with more than one virtual AP. The AP device generates and transmits a management frame that includes i) a header with a TA field set to one of the assigned BSSIDs, and ii) a frame body with a plurality of fields that includes a) a first field set to n, and b) a second field set to the n LSBs of the reference BSSID. The TA field, the first field, and the second field in the management frame indicate the reference BSSID to a client station that receives the management frame.

26 Claims, 8 Drawing Sheets

Related U.S. Application Data

(60) Provisional application No. 62/617,013, filed on Jan. 12, 2018, provisional application No. 62/394,999, filed on Sep. 15, 2016, provisional application No. 62/298,051, filed on Feb. 22, 2016.

(51) Int. Cl.
| | |
|---|---|
| *H04B 7/0452* | (2017.01) |
| *H04L 29/06* | (2006.01) |
| *H04W 48/16* | (2009.01) |
| *H04W 80/02* | (2009.01) |
| *H04W 84/12* | (2009.01) |
| *H04W 88/08* | (2009.01) |

(52) U.S. Cl.
CPC ............ *H04W 48/16* (2013.01); *H04B 7/0452* (2013.01); *H04W 80/02* (2013.01); *H04W 84/12* (2013.01); *H04W 88/08* (2013.01)

(58) Field of Classification Search
CPC .... H04W 74/00; H04W 74/002; H04L 69/22; H04L 69/324; H04B 7/0452
USPC .......................................... 370/328–330, 338
See application file for complete search history.

(56) References Cited

U.S. PATENT DOCUMENTS

| | | | |
|---|---|---|---|
| 2004/0214572 A1* | 10/2004 | Thompson ........... | H04L 12/1464 455/435.2 |
| 2008/0144591 A1 | 6/2008 | Jokela | |
| 2010/0020746 A1* | 1/2010 | Zaks ...................... | G06Q 30/02 370/328 |
| 2013/0128808 A1* | 5/2013 | Wentink ................... | H04L 69/04 370/328 |
| 2016/0014804 A1 | 1/2016 | Merlin et al. | |
| 2017/0012791 A1 | 1/2017 | Stacey et al. | |
| 2017/0105143 A1 | 4/2017 | Seok | |
| 2018/0295567 A1 | 10/2018 | Ko et al. | |

OTHER PUBLICATIONS

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

IEEE Std 802.11ac™-2013 "IEEE Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-425 (Dec. 18, 2013).

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

International Search Report and Written Opinion in International Patent Application No. PCT/US2019/013551, dated May 21, 2019 (14 pages).

* cited by examiner

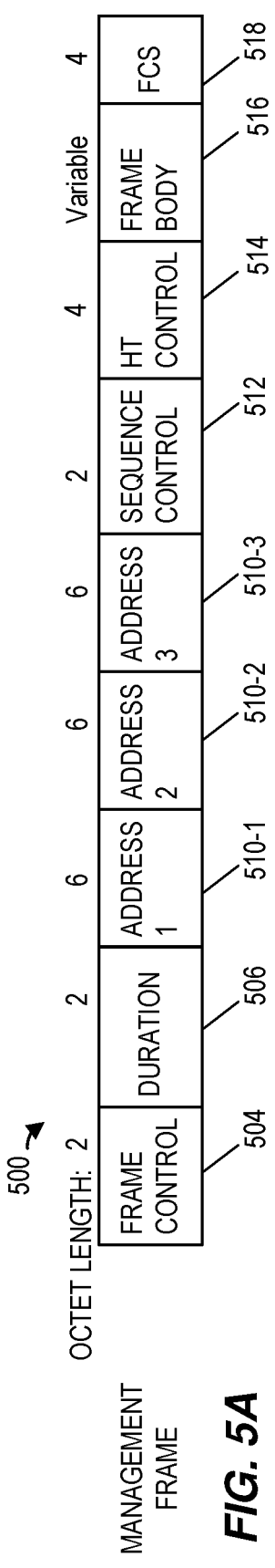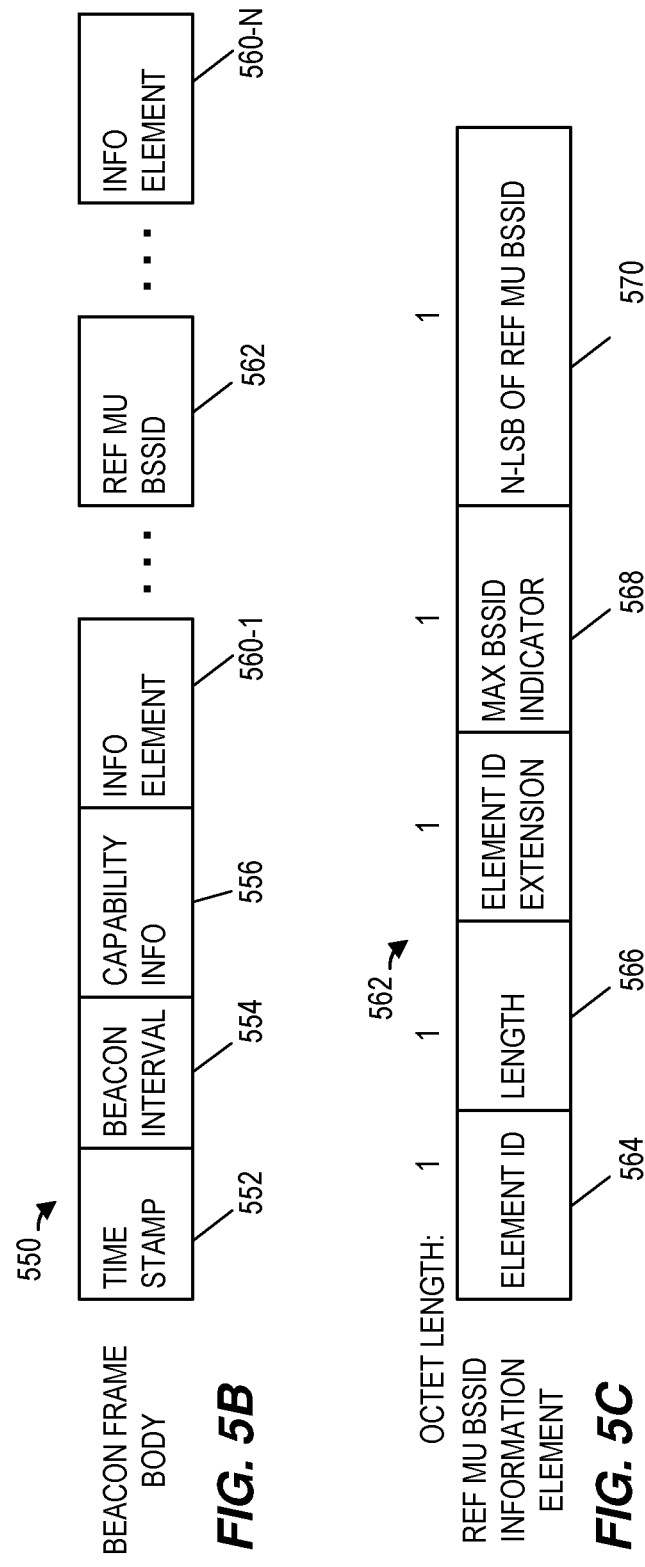

MULTIPLE BASIC SERVICE SET SUPPORT

CROSS-REFERENCES TO RELATED APPLICATIONS

This application is a continuation in part of U.S. patent application Ser. No. 15/438,732, entitled "Multiple Basic Service Set Support," filed on Feb. 21, 2017, which claims the benefit of U.S. Provisional Patent Application No. 62/298,051, entitled "Multiple BSSID Support," filed on Feb. 22, 2016, and U.S. Provisional Patent Application No. 62/394,999, entitled "Multiple BSSID Support," filed on Sep. 15, 2016. Additionally, the present application claims the benefit of U.S. Provisional Patent Application No. 62/617,013, entitled "Multiple BSSID Support," filed on Jan. 12, 2018. All of the applications listed above are incorporated herein by reference in their entireties.

FIELD OF THE DISCLOSURE

The present disclosure relates generally to communication networks and, more particularly, to multi-user data units for multiple basic service sets.

BACKGROUND

An ever-increasing number of relatively inexpensive, low power wireless data communication services, networks and devices have been made available over the past number of years, promising near wire speed transmission and reliability. Various wireless technologies is described in detail in the IEEE 802.11 Standards, including for example, the IEEE Standards 802.11a, 802.11b, 802.11g, and 802.11n and their updates and amendments, as well as the IEEE Standard 802.11ac now in the process of being adopted, all of which are collectively incorporated herein fully by reference. These standards and draft standards specify various methods of establishing connections between wireless devices. For example, in an infrastructure mode, wireless devices must first connect with a wireless access point and all communications occur via the access point. On the other hand, in an ad hoc mode, wireless devices can connect and communicate with each other directly, as opposed to communicating via an access point.

SUMMARY

In an embodiment, a method includes: determining, at an access point (AP) device, a set of basic service set identifiers (BSSIDs), wherein each BSSID in the set includes a same group of most significant bits (MSBs), wherein each BSSID in the set includes a different group of n least significant bits (LSBs), and wherein n is a positive integer; assigning, at the AP device, respective BSSIDs from the set of BSSIDs to multiple virtual APs implemented by the AP device; designating, at the AP device, one of the assigned BSSIDs as a reference BSSID, wherein the reference BSSID corresponds to a transmitter address (TA) for frames intended for client stations associated with more than one virtual AP implemented by the AP device; generating, at the AP device, a management frame that includes i) a header with a TA field set to one of the assigned BSSIDs, and ii) a frame body with a plurality of fields that includes a) a first field set to n, and b) a second field set to the n LSBs of the reference BSSID; and transmitting, by the AP device, the management frame, wherein the TA field, the first field, and the second field, indicate the reference BSSID to a client station that receives the management frame.

In another embodiment, an apparatus comprises a network interface device associated with an access point (AP) device. The network interface device includes one or more integrated circuit (IC) devices configured to: determine a set of basic service set identifiers (BSSIDs), wherein each BSSID in the set includes a same group of most significant bits (MSBs), wherein each BSSID in the set includes a different group of n least significant bits (LSBs), and wherein n is a positive integer, assign respective BSSIDs from the set of BSSIDs to multiple virtual APs implemented by the AP device, designate one of the assigned BSSIDs as a reference BSSID, wherein the reference BSSID corresponds to a transmitter address (TA) for frames intended for client stations associated with more than one virtual AP implemented by the AP device, generate a management frame that includes i) a header with a TA field set to one of the assigned BSSIDs, and ii) a frame body with a plurality of fields that includes a) a first field set to n, and b) a second field set to the n LSBs of the reference BSSID, and transmit the management frame, wherein the TA field, the first field, and the second field, indicate the reference BSSID to a client station that receives the management frame.

In yet another embodiment, a method includes: receiving, at a particular client station, a management frame from a physical access point (AP) device, wherein the management frame includes i) a header with a transmitter address (TA) field set to a particular basic service set identifier (BSSID) corresponding to a particular virtual AP among multiple virtual APs implemented by the physical AP device, and ii) a frame body with a plurality of fields that includes a) a first field set to a value n, and b) a second field set to the n LSBs of a reference BSSID, wherein the reference BSSID corresponds to a TA for frames intended for client stations associated with more than one virtual AP implemented by the AP device; wherein the particular BSSID and the reference BSSID are from a set of BSSIDs, wherein each BSSID in the set includes a same group of most significant bits (MSBs), wherein each BSSID in the set includes a different group of n least significant bits (LSBs), wherein n is a positive integer, and wherein respective BSSIDs from the set of BSSIDs correspond to respective virtual APs among the multiple virtual APs implemented by the physical AP device; determining, at the particular client station, the reference BSSID using i) the TA field, ii) the first field, and iii) the second field; and using, at the particular client station, the determined reference BSSID to identify frames transmitted by the physical AP device that are intended for client stations associated with more than one virtual AP implemented by the AP device.

In still another embodiment, an apparatus comprises a network interface device associated with a particular client station, wherein the network interface device includes one or more integrated circuit (IC) devices configured to: receive a management frame from a physical access point (AP) device, wherein the management frame includes i) a header with a transmitter address (TA) field set to a particular basic service set identifier (BSSID) corresponding to a particular virtual AP among multiple virtual APs implemented by the physical AP device, and ii) a frame body with a plurality of fields that includes a) a first field set to a value n, and b) a second field set to the n LSBs of a reference BSSID, wherein the reference BSSID corresponds to a TA for frames intended for client stations associated with more than one virtual AP implemented by the AP device; wherein the particular BSSID and the reference BSSID are from a set of BSSIDs, wherein each BSSID in the set includes a same group of most significant bits (MSBs), wherein each BSSID in the set includes a different group of n least significant bits (LSBs), wherein n is a positive integer, and wherein respective BSSIDs from the set of BSSIDs correspond to respective virtual APs among the multiple virtual APs implemented by the physical AP device; wherein the one or more IC devices are further configured to: determine the reference BSSID using i) the TA field, ii) the first field, and iii) the second field, and use the determined reference BSSID to identify frames transmitted by the physical AP device that are intended for client stations associated with more than one virtual AP implemented by the AP device.

BRIEF DESCRIPTION OF THE DRAWINGS

FIG. 5A is a diagram of an example management frame, according to an embodiment.

FIG. 5B is a diagram of an example frame body for a beacon frame having a reference (REF) MU basic service set identifier (BSSID) information element, according to an embodiment.

FIG. 5C is a diagram of an example REF MU BSSID information element, according to an embodiment.

DETAILED DESCRIPTION

In various embodiments and scenarios described below, a wireless network device such as an access point (AP) device of a wireless local area network (WLAN) supports multiple basic service sets (BSSs). In some scenarios, the physical AP device supports and announces multiple virtual access points ("virtual APs" or "VAPs"), which correspond to the multiple BSSs. Information regarding the multiple virtual APs is provided in an information element transmitted in frames by the AP device, such as in Beacon frames, probe response frames, association response frames, etc., according to some embodiments. Client stations (STAs) associated with multiple virtual APs can receive data units from multiple virtual APs in a downlink (DL) multi-user (MU) transmission, according to some embodiments. Similarly, multiple client stations can transmit data units to multiple virtual APs in an uplink (UL) MU transmission.

In some embodiments and/or scenarios, multiple virtual APs generate respective beacon frames (or respective probe response frames, or respective association response frames).

Figure 1:
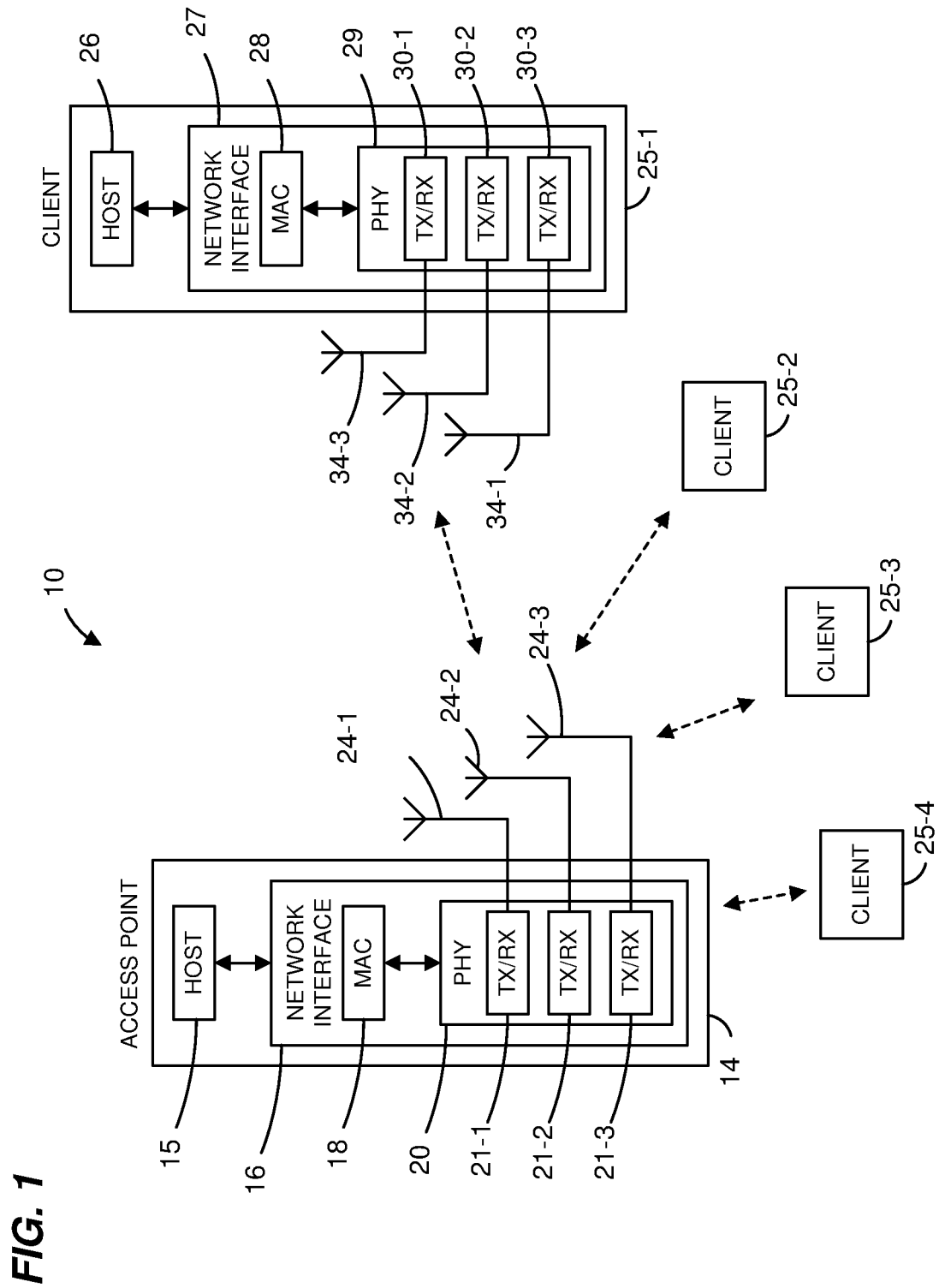
FIG. 1 is a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface 16 (or "network interface device"). In an embodiment, the network interface 16 includes one or more integrated circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized.

The network interface 16 is implemented using one or more integrate circuits (ICs) configured to operate as discussed below. For example, the MAC processor 18 may be implemented, at least partially, on a first IC, and the PHY processor 20 may be implemented, at least partially, on a second IC. As another example, at least a portion of the MAC processor 18 and at least a portion of the PHY processor 20 may be implemented on a single IC. For instance, the network interface 16 may be implemented using a system on a chip (SoC), where the SoC includes at least a portion of the MAC processor 18 and at least a portion of the PHY processor 20.

In an embodiment, the host processor 15 includes a processor configured to execute machine readable instructions stored in a memory device (not shown) such as a random access memory (RAM), a read-only memory (ROM), a flash memory, etc. In an embodiment, the host processor 15 may be implemented, at least partially, on a first IC, and the network device 16 may be implemented, at least partially, on a second IC. As another example, the host processor 15 and at least a portion of the network interface 16 may be implemented on a single IC.

In various embodiments, the MAC processor 18 and/or the PHY processor 20 of the AP 14 are configured to generate data units, and process received data units, that conform to a WLAN communication protocol such as a communication protocol conforming to the IEEE 802.11 Standard or another suitable wireless communication protocol. For example, the MAC processor 18 may be configured to implement MAC layer functions, including MAC layer functions of the WLAN communication protocol, and the PHY processor 20 may be configured to implement PHY functions, including PHY functions of the WLAN communication protocol. For instance, the MAC processor 18 may be configured to generate MAC layer data units such as MAC service data units (MSDUs), MAC protocol data units (MPDUs), etc., and provide the MAC layer data units to the PHY processor 20. MAC layer data units are sometimes referred to herein as "frames". The PHY processor 20 may be configured to receive MAC layer data units from the MAC processor 18 and encapsulate the MAC layer data units to generate PHY data units such as PHY protocol data units (PPDUs) for transmission via the antennas 24. Similarly, the PHY processor 20 may be configured to receive PHY data units that were received via the antennas 24, and extract MAC layer data units encapsulated within the PHY data units. The PHY processor 20 may provide the extracted MAC layer data units to the MAC processor 18, which processes the MAC layer data units. PHY data units are sometimes referred to herein as "packets".

In connection with generating one or more radio frequency (RF) signals for transmission, the PHY processor 20 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 20 is configured to upconvert the one or more analog baseband signals to one or more RF signals for transmission via the one or more antennas 138.

In connection with receiving one or more signals RF signals, the PHY processor 20 is configured to downconvert the one or more RF signals to one or more analog baseband signals, and to convert the one or more analog baseband signals to one or more digital baseband signals. The PHY processor 20 is further configured to process (which may include demodulating, filtering, etc.) the one or more digital baseband signals to generate a PPDU.

The PHY processor 20 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 20 is configured to generate one or more RF signals that are provided to the one or more antennas 24. The PHY processor 20 is also configured to receive one or more RF signals from the one or more antennas 24.

The MAC processor 18 is configured to control the PHY processor 20 to generate one or more RF signals by, for example, providing one or more MAC layer data units (e.g., MPDUs) to the PHY processor 20, and optionally providing one or more control signals to the PHY processor 20, according to some embodiments. In an embodiment, the MAC processor 18 includes a processor configured to execute machine readable instructions stored in a memory device (not shown) such as a RAM, a ROM, a flash memory, etc. In an embodiment, the MAC processor 18 includes a hardware state machine.

In various embodiments, the MAC processor 18 and the PHY processor 20 are configured to operate according to a first communication protocol (e.g., a High Efficiency, HE, or 802.11ax communication protocol). In some embodiments, the MAC processor 18 and the PHY processor 20 are also configured to operate according to one or more second legacy communication protocol (e.g., according to the IEEE 802.11ac Standard, the IEEE 802.11n Standard, the IEEE 802.11g Standard, and/or the IEEE 802.11a Standard).

As will be described in more detail below, the network interface 16 is configured to operate multiple virtual access points (APs). Each virtual AP manages a respective network (e.g., a basic service set (BSS)) with an associated network identifier (e.g., a BSS identifier (BSSID)), according to an embodiment.

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 or another communication device (not shown) is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27 (or "network interface device"). In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized.

The network interface 27 is implemented using one or more ICs configured to operate as discussed below. For example, the MAC processor 28 may be implemented on at least a first IC, and the PHY processor 29 may be implemented on at least a second IC. As another example, at least a portion of the MAC processor 28 and at least a portion of the PHY processor 29 may be implemented on a single IC. For instance, the network interface 27 may be implemented using an SoC, where the SoC includes at least a portion of the MAC processor 28 and at least a portion of the PHY processor 29.

In an embodiment, the host processor 26 includes a processor configured to execute machine readable instructions stored in a memory device (not shown) such as a RAM, a ROM, a flash memory, etc. In an embodiment, the host processor 26 may be implemented, at least partially, on a first IC, and the network device 27 may be implemented, at least partially, on a second IC. As another example, the host processor 26 and at least a portion of the network interface 27 may be implemented on a single IC.

In various embodiments, the MAC processor 28 and the PHY processor 29 of the client device 25-1 are configured to generate data units, and process received data units, that conform to the WLAN communication protocol or another suitable communication protocol. For example, the MAC processor 28 may be configured to implement MAC layer functions, including MAC layer functions of the WLAN communication protocol, and the PHY processor 29 may be configured to implement PHY functions, including PHY functions of the WLAN communication protocol. The MAC processor 28 may be configured to generate MAC layer data units such as MSDUs, MPDUs, etc., and provide the MAC layer data units to the PHY processor 29. The PHY processor 29 may be configured to receive MAC layer data units from the MAC processor 28 and encapsulate the MAC layer data units to generate PHY data units such as PPDUs for transmission via the antennas 34. Similarly, the PHY processor 29 may be configured to receive PHY data units that were received via the antennas 34, and extract MAC layer data units encapsulated within the PHY data units. The PHY processor 29 may provide the extracted MAC layer data units to the MAC processor 28, which processes the MAC layer data units.

The PHY processor 29 is configured to downconvert one or more RF signals received via the one or more antennas 34 to one or more baseband analog signals, and convert the analog baseband signal(s) to one or more digital baseband signals, according to an embodiment. The PHY processor 29 is further configured to process the one or more digital baseband signals to demodulate the one or more digital baseband signals and to generate a PPDU. The PHY processor 29 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 29 is configured to generate one or more RF signals that are provided to the one or more antennas 34. The PHY processor 29 is also configured to receive one or more RF signals from the one or more antennas 34.

The MAC processor 28 is configured to control the PHY processor 29 to generate one or more RF signals by, for example, providing one or more MAC layer data units (e.g., MPDUs) to the PHY processor 29, and optionally providing one or more control signals to the PHY processor 29, according to some embodiments. In an embodiment, the MAC processor 28 includes a processor configured to execute machine readable instructions stored in a memory device (not shown) such as a RAM, a ROM, a flash memory, etc. In an embodiment, the MAC processor 28 includes a hardware state machine.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

Figures 2A, 2B:
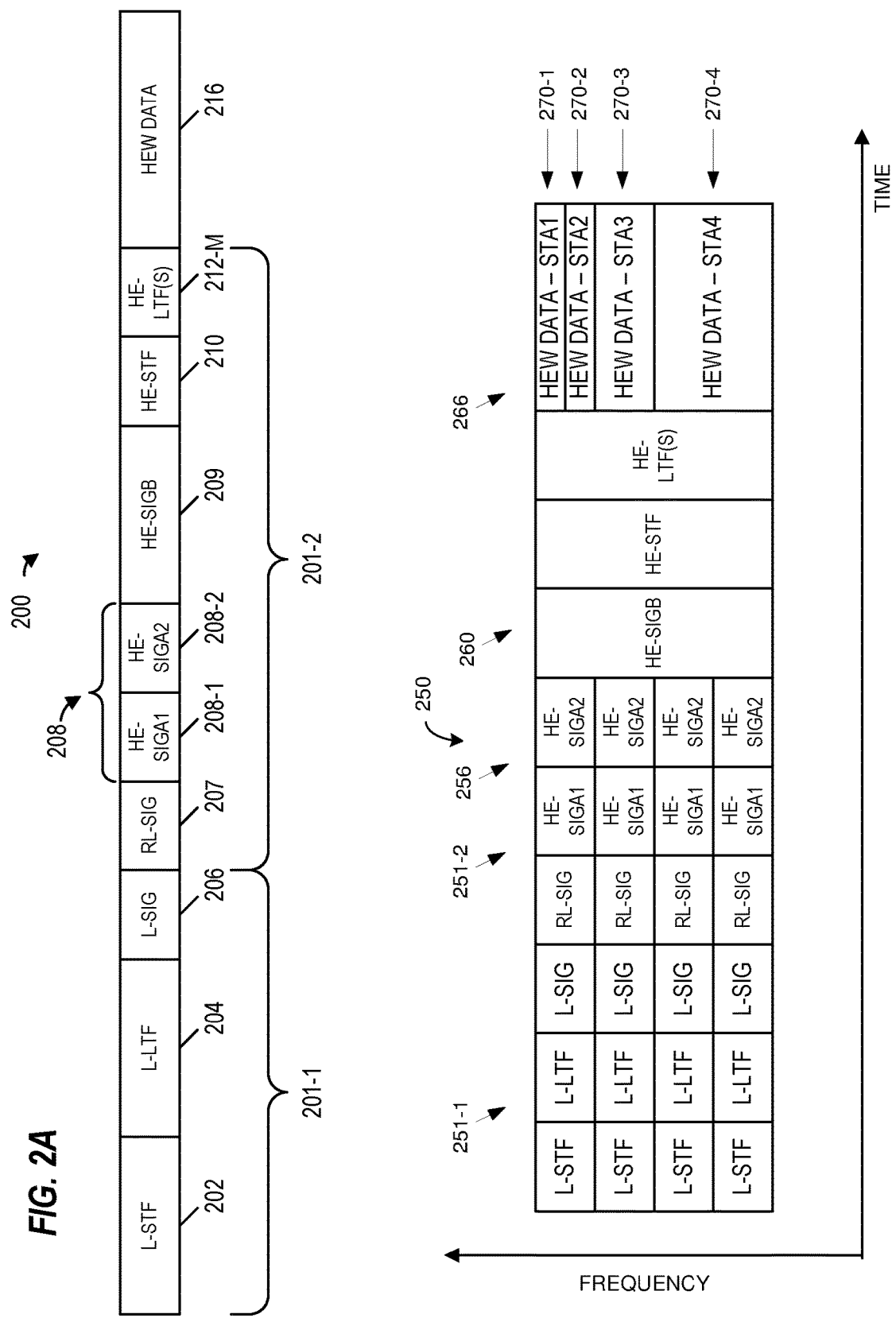
FIG. 2A is a diagram of an example physical layer (PHY) data unit, according to an embodiment.
FIG. 2B is a diagram of another example PHY data unit, according to an embodiment.

FIG. 2A is a diagram of an example PHY data unit 200, according to an embodiment. The PHY data unit 200 conforms to the first communication protocol (High Efficiency, HE, or 802.11ax communication protocol), in an embodiment. The AP 14 is configured to transmit the PHY data units having the format 200 to the client station 25-1 or the client stations via orthogonal frequency division multiplexing (OFDM) modulation, according to an embodiment. In an embodiment, the client station 25-1 is also configured to transmit PHY data units having the format 200 to the AP 14. In some embodiments, the PHY data unit 200 occupies a 20 MHz bandwidth. PHY data units that conform to the first communication protocol similar to the data unit 200 may occupy other suitable bandwidths such as 2 MHz, 5 MHz, 10 MHz, 40 MHz, 80 MHz, 160 MHz, 320 MHz, 640 MHz, etc., for example, or other suitable bandwidths, in other embodiments. The data unit 200 is suitable for "mixed mode" situations, i.e., when the WLAN 10 includes a client station (e.g., the legacy client station 25-4) that conforms to a legacy communication protocol, but not the first communication protocol. The PHY data unit 200 is utilized in other situations as well, in some embodiments.

In an embodiment, the PHY data unit 200 includes a preamble 201 having a legacy short training field (L-STF) 202, a legacy long training field (L-LTF 204), a legacy signal field (L-SIG 206), a repeated legacy signal field (RL-SIG) 207 that follows the L-SIG 206, a first HE signal field (HE-SIGA) 208 that spans two OFDM symbols: HE-SIGA1 208-1 and HE-SIGA2 208-2, a second HE signal field (HE-SIGB) 209, an HE short training field (HE-STF) 210, and M HE long training fields (HE-LTFs) 212, where M is a suitable positive integer that generally corresponds to a number of spatial streams being used to transmit the PHY data unit 200. In an embodiment, the preamble 201 includes a legacy portion 201-1, including the L-STF 202, the L-LTF 204, and the L-SIG 206, and a non-legacy portion 201-2, including the RL-SIG 207, HE-SIGAs 208, HE-SIGB 209, HE-STF 210, and M HE-LTFs 212.

Each of the L-STF 202, the L-LTF 204, the L-SIG 206, the HE-SIGAs 208, the HE-SIGB 209, the HE-STF 210, and the M HE-LTFs 212 are included in an integer number of one or more OFDM symbols. For example, in an embodiment, the HE-SIGA 208 corresponds to two OFDM symbols. In some embodiments, the PHY data unit 200 also includes a data portion 216. In other embodiments, the PHY data unit 200 omits the data portion 216 (e.g., the data unit 200 is a null-data packet).

In the embodiment of FIG. 2A, the PHY data unit 200 includes one of each of the L-STF 202, the L-LTF 204, the L-SIG 206, and the HE-SIGA1s 208. In other embodiments in which an OFDM data unit similar to the data unit 200 occupies a cumulative bandwidth other than 20 MHz, each of the L-STF 202, the L-LTF 204, the L-SIG 206, the RL-SIG 207, and the HE-SIGA1s 208 is repeated over a corresponding number of 20 MHz-wide sub-channels of the whole bandwidth of the data unit, in an embodiment. For example, in an embodiment, the OFDM data unit occupies an 80 MHz bandwidth and, accordingly, includes four of each of the L-STF 202, the L-LTF 204, the L-SIG 206, the RL-SIG 207, and the HE-SIGA1s 208 in four 20 MHz-wide sub-channels that cumulatively span the 80 MHz bandwidth, in an embodiment. In some embodiments, the modulation of different 20 MHz-wide sub-channels signals is rotated by different phase shifts. For example, in one embodiment, a first sub-channel is rotated 0-degrees, a second sub-channel is rotated 90-degrees, a third sub-channel is rotated 180-degrees, and a fourth sub-channel is rotated 270-degrees. In other embodiments, different suitable rotations are utilized. The different phases of the 20 MHz-wide sub-channels signals result in reduced peak to average power ratio (PAPR) of OFDM symbols in the PHY data unit 200, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIGB and the HE data portion occupy the corresponding whole bandwidth of the data unit.

FIG. 2B is a diagram of an example multi-user (MU) PHY data unit 250 utilized in orthogonal frequency division multiple access (OFDMA) communication, according to an embodiment. The MU PHY data unit 250 includes a PHY preamble 251 having a legacy portion 251-1 and a non-legacy (HE) portion 251-2.

The non-legacy portion 251-2 includes a HE-SIGA portion 256 that includes an HE-SIGA field such as the HE-SIGA field 208 (FIG. 2A). The non-legacy portion 251-2 also includes a HE-SIGB portion 260 that includes an HE-SIGB field such as the HE-SIGB field 209 (FIG. 2A).

The MU PHY data unit 250 also includes a data portion (HE-DATA) 266. Independent data streams in the data portion 266 are transmitted via different frequency subbands (sometimes referred to herein as "resource units" (RUs)), and/or different spatial streams. For example, different RUs and/or spatial streams may be allocated to different client stations, in some scenarios.

The HE-SIGA portion 256 includes a field with a shortened (with respect to BSSIDs) identifier that identifies the BSS to which the PHY data unit 250 corresponds; this shortened identifier is sometime referred to as a "BSS color" or a "color". The BSS color allows stations to quickly determine if the PHY data unit 250 corresponds to the BSS to which the station belongs, or another BSS. This may be useful, for example, for spatial reuse operations when multiple physical APs are operating in relatively close proximity. For example, when a station receives a PPDU with a color that is different than the color of the BSS to which the station is associated, the station uses a higher energy threshold (as compared to an energy threshold used for PPDUs having the same color as the BSS to which the station is associated) for determining whether a channel medium is idle. In an embodiment, all virtual APs corresponding to a single physical AP use a same BSS color.

When the PHY data unit 250 is a downlink PHY data unit, the HE-SIGB portion 260 includes allocation information that indicates the allocation of subbands and/or spatial streams in the data portion 266 to client stations. A client station, when receiving the MU PHY data unit 250, processes the allocation information in the HE-SIGB portion 260 to determine which RU(s) and/or spatial streams are allocated to the client station, e.g., which RU(s) and/or spatial streams have data intended for the client station. In some embodiments, the allocation information includes station identifiers (e.g., association identifiers (AIDs), or partial AIDs) for use in associating particular RUs and/or spatial streams to client stations.

In some embodiments, a particular RU may be allocated for all client stations associated with all virtual APs corresponding to a physical AP, for example when the physical AP needs to broadcast information to all of the client stations associated with all of the virtual APs. In such situations, a particular station identifier is reserved for allocating an RU to all client stations associated with all virtual APs. In one illustrative embodiment, the reserved station identifier for allocating an RU to all client stations associated with all virtual APs is 2047. In other embodiments, another suitable station identifier value (e.g., other than 2047) is reserved for allocating an RU to all client stations associated with all virtual APs.

In an embodiment, when the PHY data unit 250 is an uplink PHY data unit, the HE-SIGB portion 260 is omitted from the PHY data unit 250. For example, uplink PHY data units are prompted by a trigger frame transmitted by the AP, and the trigger frame includes allocation information that indicates to client stations the RUs and/or spatial streams that the client stations are to use when transmitting as part of the uplink PHY data unit.

In the illustrative example of FIG. 2B, the PHY data unit 250 includes a plurality of resource units (RUs) 270-1, 270-2, 270-3, and 270-4 having independent data streams corresponding to four client stations 25 (STA1, STA2, STA3, and STA4, respectively).

In the illustrated embodiment, the PHY data unit 250 occupies an 80 MHz bandwidth. In other embodiments, the PHY data unit 250 occupies another suitable bandwidth.

In an embodiment in which the PHY data unit 250 corresponds to a downlink PHY data unit, the PHY data unit 250 is generated by the AP 14 such that each RU 270 corresponds to a respective client station 25 and occupies a respective sub-band allocated for downlink transmission to the client station. Similarly, in an embodiment in which the PHY data unit 250 corresponds to an uplink OFDMA data unit, the AP 14 receives the RUs 270 via respective sub-bands allocated for uplink transmission from the client stations. For example, the RU 270-1 is transmitted via a first 10 MHZ sub-band, the RU 270-2 is transmitted via a second 10 MHz sub-band, the RU 270-3 is transmitted via a 20 MHz sub-band, and the RU 270-4 is transmitted via a 40 MHz sub-band, in the illustrated embodiment.

In an embodiment, each RU includes an A-MPDU which aggregates one or more of data frames, management frames, and control frames, or an MPDU (single data frame, single management frame, or single control frame). In an embodiment, the content of each of the non-legacy preambles 251-2 can be variant for different client stations depending on factors such as rate, data quantity, configuration (e.g., number of antennas, number of supported multiple input, multiple output (MIMO) data streams, etc.) of the different client stations.

Figure 3:
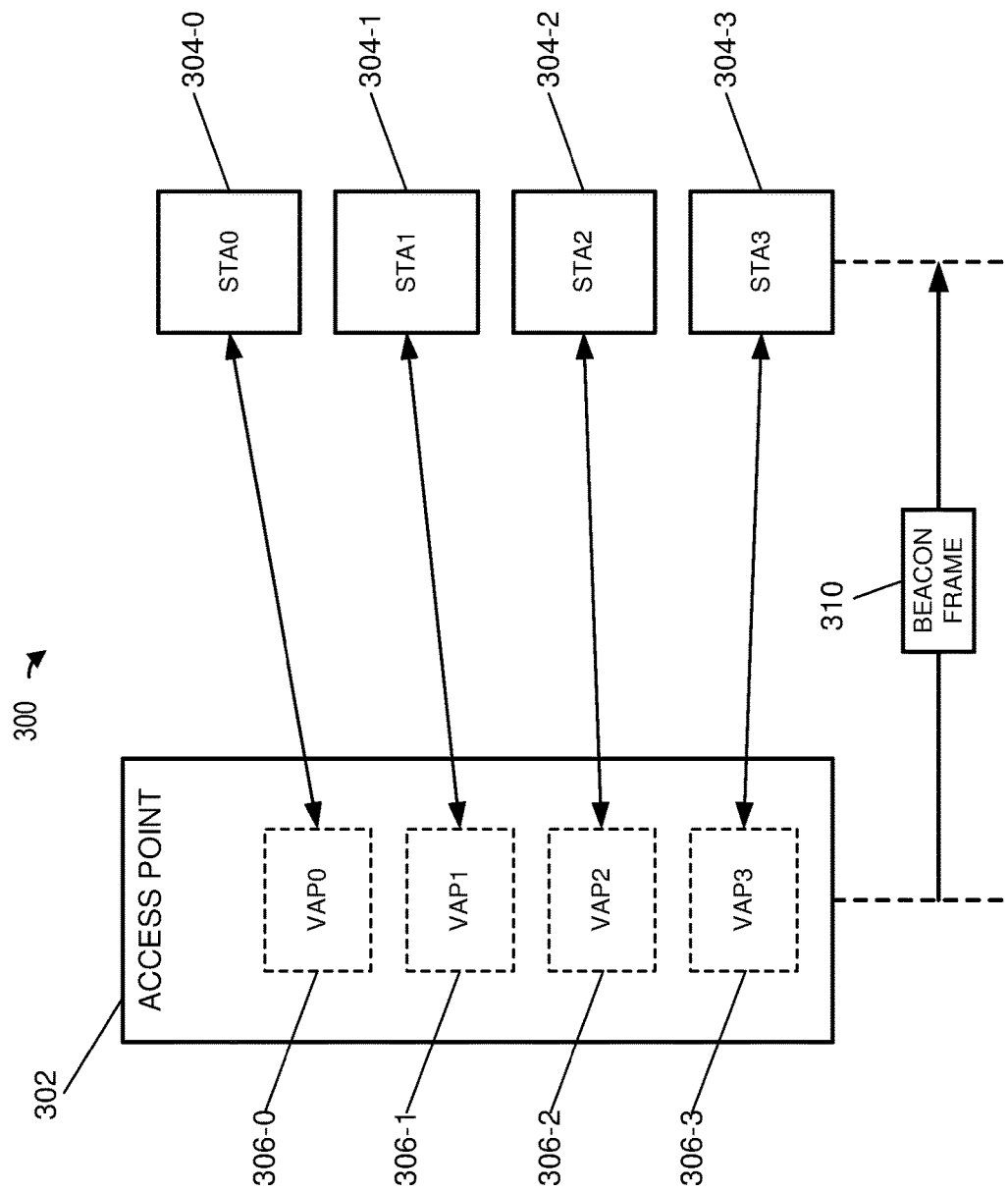
FIG. 3 is a diagram an example WLAN having an access point (AP) that supports multiple basic service sets (BSSs), according to an embodiment.

FIG. 3 is a diagram an example WLAN 300 having an access point (AP) device 302 that supports virtual APs and accordingly multiple BSSs for client stations 304, according to an embodiment. In an embodiment, the virtual APs supported (e.g., owned) by AP device 302 and client stations 304 generally correspond to the AP 14 and the client stations 25, respectively. In other embodiments, the AP device 302 and client stations 304 correspond to any other suitable communication devices. In various embodiments, the virtual APs owned by AP device 302 include the capability to advertise information for multiple virtual APs identified by basic service set identifiers (BSSIDs) in a set of BSSIDs corresponding to the multiple BSSs using multiple Beacon, and/or Probe Response, and/or Association Response frames, each corresponding to a single BSSID. In an embodiment, a set of BSSIDs corresponding to virtual APs is a set where: i) all members of the set use a common operating class, channel, Channel Access Functions, and antenna connector, ii) the set has a maximum range of $2^n$ for at least one n, where $1 \leq n \leq 48$, iii) members of the set have the same 48-n most significant bits (MSBs) in their BSSIDs, and iv) all BSSIDs within the set are assigned in a way that they are not available as MAC addresses for STAs using a different operating class, channel or antenna connector. In an embodiment, one of the BSSIDs in the set is designated as a reference multi-user (MU) BSSID (sometimes referred to herein as a "reference BSSID" or a "transmitted BSSID"). The reference BSSID is used as a transmitter address (TA) in frames, within downlink (DL) MU transmissions, that are intended for a group of client stations that are associated with multiple virtual APs 306, according to an embodiment. The reference BSSID is used as a receiver address (RA) for frames, within uplink (UL) MU transmissions, corresponding to multiple virtual APs 306, according to an embodiment.

In some embodiments, a virtual AP 306 generates and transmits a management frame (e.g., a beacon frame, a probe response frame, an association response frame, etc.), where a TA field of the management frame is set to the BSSID of the virtual AP 306, and the management frame also includes information that indicates the reference BSSID. A client station 304 that receives the management frame can then determine i) the BSSID of the virtual AP 306, and ii) the reference BSSID. When the client station 304 is associated with the virtual AP 306, the client station uses i) the determined BSSID of the virtual AP 306, and ii) the determined reference BSSID, to filter frames transmitted by the physical AP 302. Additionally, the client station sets an RA field of frames transmitted to the physical AP 302 to either the i) the determined BSSID of the virtual AP 306, or ii) the determined reference BSSID.

In the embodiment shown in FIG. 3, the AP device 302 supports multiple VAPs 306, referred to herein as VAP0, VAP1, VAP2, and VAP3, which include BSS 306-0, BSS 306-1, BSS 306-2, and BSS 306-3 respectively (BSSS 306-0/1/2/3 can be referred to as VAP 0/1/2/3 respectively). In some embodiments, the AP device 302 is a single, physical AP that supports the virtual access points.

Figure 4:
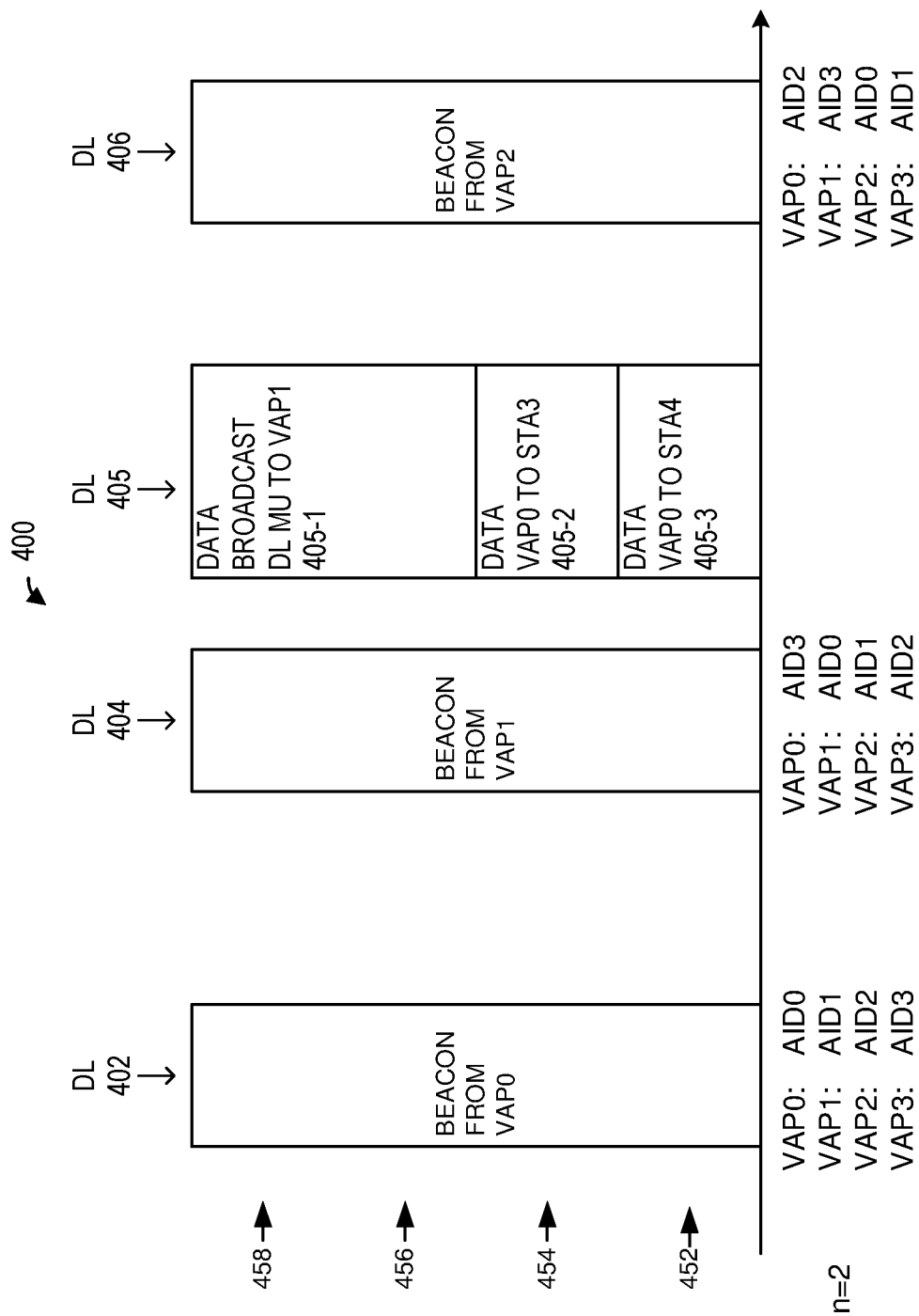
FIG. 4 is a diagram of example beacon frames transmitted by the AP of FIG. 3 for different BSSs, according to an embodiment.

FIG. 4 is a diagram of example beacon frames 402, 404, and 406 transmitted by an AP that supports multiple BSSs VAP0, VAP1, VAP2, and VAP3 corresponding to a set of BSSIDs, according to an embodiment. In an embodiment, the AP 302 determines a parameter n which defines a maximum number of VAPs supported by the AP 302. In the embodiment shown in FIG. 4, the beacon frames 402, 404, and 406 include i) respective TA fields set to the respective BSSID of the respective virtual AP 306, and ii) information that indicates the reference BSSID.

In the embodiment shown in FIG. 4, the AP generates and transmits a downlink multi-user OFDMA data unit 405, after the beacon frame 404, to i) client stations associated with the VAP1, ii) client station STA3, and iii) client station STA4. In an embodiment, the multi-user OFDMA data unit 405 has a format similar to the PHY data unit 250 of FIG. 2B. In an embodiment, the HE-SIGB field 209 of the OFDM data unit 405 includes a STA-ID subfield set to the AID associated with the VAP1.

In some embodiments and/or scenarios, a client station transmits an uplink PHY data unit, for example, in response to a downlink trigger frame, soliciting frame, or other suitable frame. When the trigger frame is destined to client stations associated with different VAPs, the transmitter address (TA) field in the trigger frame is set to the reference BSSID. When the trigger frame is destined to client stations associated with a single VAP, the TA field in the trigger frame is set to the BSSID of the single VAP. In an embodiment, when a trigger frame solicits a control frame to be included in an uplink MU transmission, and when the TA field in the trigger frame is set to the reference BSSID, the client station sets the receiver address (RA) field in the solicited control frame to the reference BSSID, at least in some situations. In an embodiment, when a trigger frame solicits a control frame to be included in an uplink MU transmission, and when the TA field in the trigger frame is set to the BSSID of a VAP, the client station sets the RA field in the solicited control frame to the BSSID of the VAP, at least in some situations. In an embodiment, when a trigger frame solicits a management frame or a data frame to be included in an uplink MU transmission, the client station sets the RA field in the solicited management/data frame to the BSSID of the VAP to which the management/data frame is intended, at least in some situations. In an embodiment, all TA fields of MPDUs within an A-MPDU are the same, and all RA fields of the MPDUs within the A-MPDU are the same.

FIG. 5A is a diagram of an example MPDU 500 for a data frame, management frame, or control frame (data/management/control frame 500), according to an embodiment, where some fields may not be needed by a control frame. The data/management/control frame 500 corresponds to a QoS Data frame, Trigger frame, beacon frame, probe response frame, association response frame, Action frame, or other suitable frame, in various embodiments and/or scenarios. In various embodiments and/or scenarios, the data/management/control frame 500 is included in a downlink (DL) single user (SU) PHY data unit transmitted by the AP 14 to a client station 25 or a DL multi-user (MU) PHY data unit transmitted by the AP 14 to multiple client stations 25. In some embodiments and/or scenarios, the data/management/control frame 500 is included in an uplink (UL) PHY data unit transmitted by a single client station 25 to the AP 14. In some embodiments and/or scenarios, the data/management/control frame 500 is included in an UL MU PHY data unit transmitted by multiple client stations, for example, over respective frequency sub-bands and/or over respective spatial streams (e.g., using MU-MIMO transmission).

The data/management/control frame 500 has a format the same as or similar to a MAC frame format for a management frame as defined in the IEEE 802.11REVmc draft standard or in the IEEE 802.11ax draft standard, in various embodiments. The data/management/control frame 500 includes a frame control field 504 (2 octets), a duration/ID field 506 (2 octets), a first address field 510-1 (6 octets), a second address field 510-2 (6 octets), a third address field 510-3 (6 octets), a sequence control field 512 (2 octets), a high throughput (HT) control field 514 (4 octets), a frame body 516 (variable number of octets), and a frame check sequence (FCS) field 518 (4 octets), in the illustrated embodiment. The number above each field in FIG. 5A indicates the number of octets occupied by the corresponding field, according to an example embodiment. In other embodiments, one or more of the fields illustrated in FIG. 5A has a different suitable length. Each of the address fields 510 is a 48 bit (6 octets) field that includes a MAC address of a device associated with the data unit 500, such as a transmitting device (transmitter) of the data unit 500, a receiving device (receiver) of the data unit 500, a BSSID associated with the data unit 500, etc.

FIG. 5B is a diagram of an example frame body 550 for a beacon frame that includes information regarding a set of BSSIDs corresponding to multiple VAPs, according to an embodiment. In an embodiment in which the frame 500 (FIG. 5A) corresponds to a beacon frame, the frame body 550 corresponds to the frame body 516 (FIG. 5A). In other embodiments and/or scenarios, the frame body 550 is the frame body 516 of a probe response frame, an association response frame, or other suitable frame. In the embodiment shown in FIG. 5B, the frame body 550 is similar to a beacon frame format as defined in the IEEE 802.11REVmc draft standard or the IEEE 802.11ax draft standard.

In the embodiment shown in FIG. 5B, the frame body 550 includes a time stamp field 552, a beacon interval field 554, a capability information field 556, and N information elements 560, where N is a suitable positive integer. The beacon interval 554 is omitted in an embodiment, for example, when the frame body 550 corresponds to an association response frame.

The information elements 560 include information regarding a set of BSSIDs corresponding to multiple VAPs. In an embodiment, the information regarding the set of BSSIDs corresponding to multiple VAPs is included in an information element 562, referred to herein a reference multi-user (MU) BSSID (REF MU BSSID) element. In an embodiment, the REF MU BSSID element 562 is a stand-alone information element of the beacon frame, for example, when the beacon frame does not include a multiple BSSID element. In other embodiments, the REF MU BSSID element 562 is not included in a data/management/control frame as a standalone information element; instead information in the REF MU BSSID element 562 is included in another information element of the data/management/control frame (e.g., in an HE Operation element as described below).

FIG. 5C is a diagram of an example REF MU BSSID element 562, according to an embodiment. The REF MU BSSID element 562 includes an element ID field 564 (1 octet), a length field 566 (1 octet), a maximum BSSID indicator 568 (1 octet), and a reference BSSID information field 570 (1 octet). The number above each field in FIG. 5C indicates the number of octets occupied by the corresponding field, according to an example embodiment. In other embodiments, one or more of the fields illustrated in FIG. 5C has a different suitable length. In an embodiment, the reference BSSID information field 570 can be more than 1 octet if the value in the maximum BSSID indicator field 568 is greater than eight, in some embodiments.

The maximum BSSID indicator field 568 is set to the parameter n, where $2^n$ is a maximum number of BSSIDs in the set of BSSIDs corresponding to the VAPs, in an embodiment. The parameter n corresponds to the maximum number of VAPs supported by the AP 302, according to an embodiment.

The reference BSSID information field 570 includes an indication of n of LSBs of the reference BSSID (reference MU BSSID) where n is specified by the maximum BSSID indicator field 568, in an embodiment. The AP 14 provides n of LSBs of the reference BSSID so that a receiver of the REF MU BSSID element 562 can derive the reference BSSID (e.g., using the n of LSBs of the reference BSSID in the field 570 and a TA in one of the address fields 510. In an embodiment, the n of LSBs of the reference BSSID in the field 570 also indicates a fixed mapping of AIDs to BSSIDs of the VAPs.

In an embodiment, all VAPs 306 of the same AP device 302 have a same 48-n MSBs of the corresponding BSSID. In an embodiment, the n LSBs of the reference BSSID define a reference BSSID corresponding to a particular AID (e.g., AID0) for broadcast DL resource units (RUs). In this embodiment, the reference BSSID provides a fixed mapping of AIDs to BSSIDs in the multiple BSSID set, regardless of which VAP of the multiple BSSID set transmits the management frame 500.

The maximum BSSID indication 570 contains a value assigned to n, where $2^n$ is the maximum number of BSSIDs in the multiple BSSID set or the maximum number of VAPs of an AP device defined by multiple BSSID set, in an embodiment. In the embodiment shown in FIG. 4, n is at least 2, and four BSSIDs ($2^2$ BSSIDs, corresponding to VAP0, VAP1, VAP2, and VAP3) are included in the set of BSSIDs. In an embodiment in which n is 2, among four VAPs, two LSBs of their BSSIDs are different, and 46 MSBs of their BSSIDs are the same. In some scenarios, only a portion of the BSSIDs in the set of BSSIDs are used for VAPs (e.g., if n is 3, the maximum number of VAPs is eight, but only four BSSIDs are used for VAP0, VAP1, VAP2, and VAP3). In various embodiments, the AIDs corresponding to the BSSIDs of the multiple BSSID set can be derived by a receiver of the data/management/control frame 500 based on i) the parameter n in the maximum BSSID indicator field 568, ii) the n of LSBs of the reference BSSID in the field 570, and iii) a transmitter address 510-1 of the management frame 500.

In various embodiments, the AID mapped to a VAP is AID0 if the BSSID of the VAP (i.e., the transmitter address of a beacon for the VAP) is the same as a reference MU BSSID. In an embodiment, the reference MU BSSID is a member of the set of BSSIDs, and thus the reference MU BSSID shares the same (48-n) MSBs with other members of the multiple-BSSID set, and the remaining n LSBs of the reference MU BSSID are provided in the field 570. In an embodiment, the receiver (e.g., client station 25) determines the reference MU BSSID by determining a value of BSSID_A OP_OR BSSID_B, where OP_OR is a Boolean OR operation, BSSID_A is a BSSID with (48-n) MSBs equal to the (48-n) MSBs of the transmitter address of the frame 500 concatenated with n LSBs equal to zero, and BSSID_B is a BSSID with (48-n) MSBs equal to zero concatenated with the n LSBs specified by the field 570.

For BSSIDs other than the reference MU BSSID, the receiver derives the AID of the VAP as AID0+i when the BSSID of the VAP is equal to BSSID_A OP_OR BSSID_B, where OP_OR is a Boolean OR operation, BSSID_A is a BSSID with (48-n) MSBs equal to the (48-n) MSBs of the transmitter address of the frame 500 concatenated with n LSBs equal to zero, and BSSID_B is a BSSID with (48-n) MSBs equal to zero concatenated with the n LSBs of a sum of i and the n LSBs of the reference identifier 568, in an embodiment. In this embodiment, the sum of i and the n LSBs of the reference identifier 568 provides a circular numbering system for AID values.

In an embodiment, for example, the AP 14 supports the VAP0, VAP1, and VAP2, corresponding to BSSIDs of 16, 17, and 27 (0x000000000010, 0x000000000011, and 0x00000000001B). In an embodiment, the set BSSID set is described by n=4 ($2^n$=16) with BSSIDs in the range 0x000000000010-0x00000000001F. In this embodiment, for example, the BSSID 27 (0x00000000001B) is the reference MU BSSID and thus corresponds to AID0, the maximum BSSID indication has a value of n=4, the field 570 has a value of 00001011 (0xB), and the (48-n) MSBs of the reference MU BSSID have a value of 0x00000000001. In one scenario, the management frame 500 has a transmitter address of 0x000000000010, and thus the BSSID_A is 0x00000000001, and the value of i which results in a sum having the 4 LSBs equal to B (matching the 4 LSBs of the reference BSSID) is 0xB. In other words, 0x0 plus 0xB is 0xB, resulting in the BSSID 16 (0x000000000010) being mapped to AID0+11. In a similar manner, the BSSID 17 is mapped to AID0+12 in this embodiment.

Figure 6:
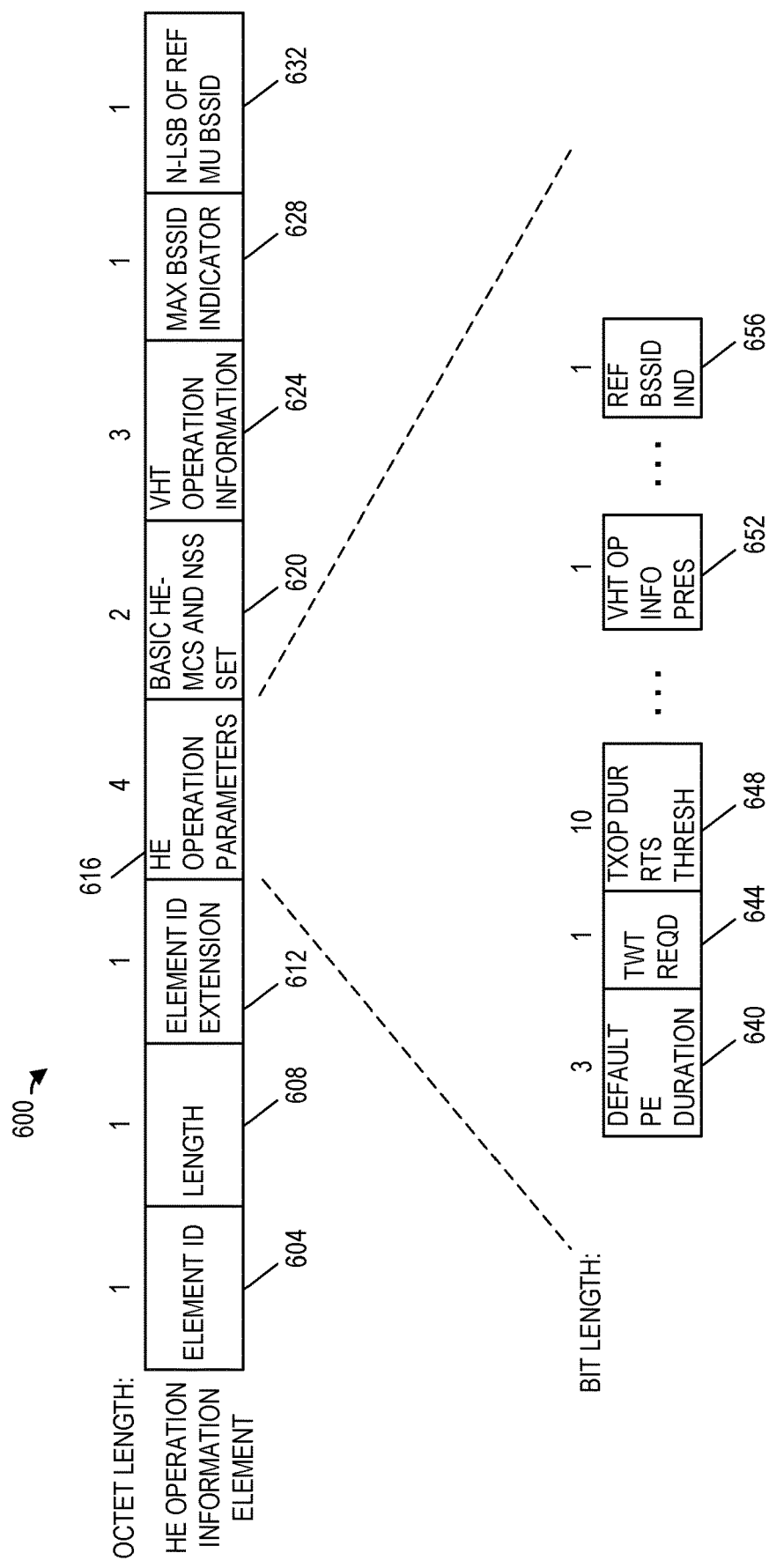
FIG. 6 is a diagram of an example high efficiency (HE) operation information element, according to an embodiment.

In some embodiments, information in the fields 568 and 570 are included within an information element such as an HE Operation information element similar to HE Operation information element defined by the IEEE 802.11ax draft standard. FIG. 6 is diagram of an example HE Operation information element 600, according to an embodiment. The HE Operation information element 600 is included in a data/management/control frame according to an embodiment. For example, the HE Operation information element 600 is included in a frame body (e.g., frame body 516) of a MAC data unit such as the frame 500 (FIG. 5A), or another suitable MAC data unit. For example, in an embodiment in which the HE Operation information element 600 is included in the frame 500 (FIG. 5A), the HE Operation information element 600 is included as one of the information elements 560 and the information element 562 is omitted from the frame 500.

The number above each field in FIG. 6 indicates the number of octets or bits occupied by the corresponding field, according to an example embodiment. In other embodiments, one or more of the fields illustrated in FIG. 6 has a different suitable length.

The HE Operation information element 600 includes an element identifier field 604, a length field 608, and an element ID extension field 612. The element identifier field 604 and the element ID extension field 612 include respective values that together identify the information element 600 as an HE Operation information element. The length field 608 includes a value that indicates a length of the HE Operation information element 600.

An HE operation parameters field 616 includes various information discussed in more detail below. A basic HE-MCS and Nss set field 620 indicates MCSs for each number of spatial streams in HE PPDUs that are supported by all HE STAs in the BSS in transmit and receive, according to an embodiment. A VHT operation information field 624 includes information regarding a channel width, and channel center frequency(ies) for certain channel bandwidths, in an embodiment. In some situations, the VHT operation information field 624 is omitted from the HE Operation information element 600.

The HE Operation information element 600 also includes a maximum BSSID indicator field 628 and a reference BSSID information field 632. The maximum BSSID indicator field 628 is similar to the maximum BSSID indicator 568 discussed above with respect to FIGS. 5A-C. The reference BSSID information field 632 is similar to the reference BSSID information field 570 discussed above with respect to FIGS. 5A-C. In some situations, the maximum BSSID indicator field 628 and the reference BSSID information field 632 are omitted from the HE Operation information element 600.

The HE operation parameters field 616 includes a default PE duration subfield 640 indicates a Packet Extension (PE) field duration in units of 4 μs for an PPDU that is to be transmitted in response to a trigger frame. A TWT required subfield 644 indicates a role according to which client stations are to operate with regard to target wake time (TWT) operation. A TXOP Duration RTS Threshold subfield 648 includes information indicating when a client station should use a request to send (RTS)/clear to send (CTS) procedure to obtain a transmit opportunity period (TXOP) when the client station has a PPDU to transmit.

A VHT operation information present indicator subfield 652 indicates whether the VHT operation information field 624 is present in the HE Operation information element 600. A references BSSID present indicator subfield 656 indicates whether the maximum BSSID indicator field 628 and the reference BSSID information field 632 are present in the HE Operation information element 600.

Referring again to FIG. 3, in some scenarios, the AP 302 generates and transmits beacon frames, probe response frames, and association response frames that do not include a REF MU BSSID element such as the REF MU BSSID element 562 (FIG. 5C) and also do not include an HE operation information element i) that includes a max BSSID indicator field such as the field 628 (FIG. 6) and ii) that includes a reference BSSID information field such as the field 632 (FIG. 6), in some embodiments. In such scenarios, the AP 302 selects the same BSS color for all VAPs that have BSSIDs with the same 48-n MSBs, according to an embodiment, which helps prevent spatial reuse transmission collisions between BSSs corresponding to the VAPs.

In such scenarios, the network interface 27 of the client station 25-1 (FIG. 1) is configured to, when any address field 510 (FIG. 5A) in an MPDU within a received PPDU has an address with the same n MSBs of the BSS with which the client station 25-1 is associated, use a lower threshold (e.g., −82 dbm) (lower as compared to a threshold used for PPDUs with a different BSS color), according to an embodiment, which helps prevent spatial reuse transmission collisions between BSSs corresponding to the VAPs.

In such scenarios, all VAPs with BSSIDs having a same n MSBs allocate station IDs for client stations from a same set of station IDs such that each client station served by all of the VAPs is assigned a different station ID, according to an embodiment, which permits simultaneous DL transmissions of A-MPDUs to client stations associated with different VAPs within a same downlink MU PHY data unit.

Figure 7:
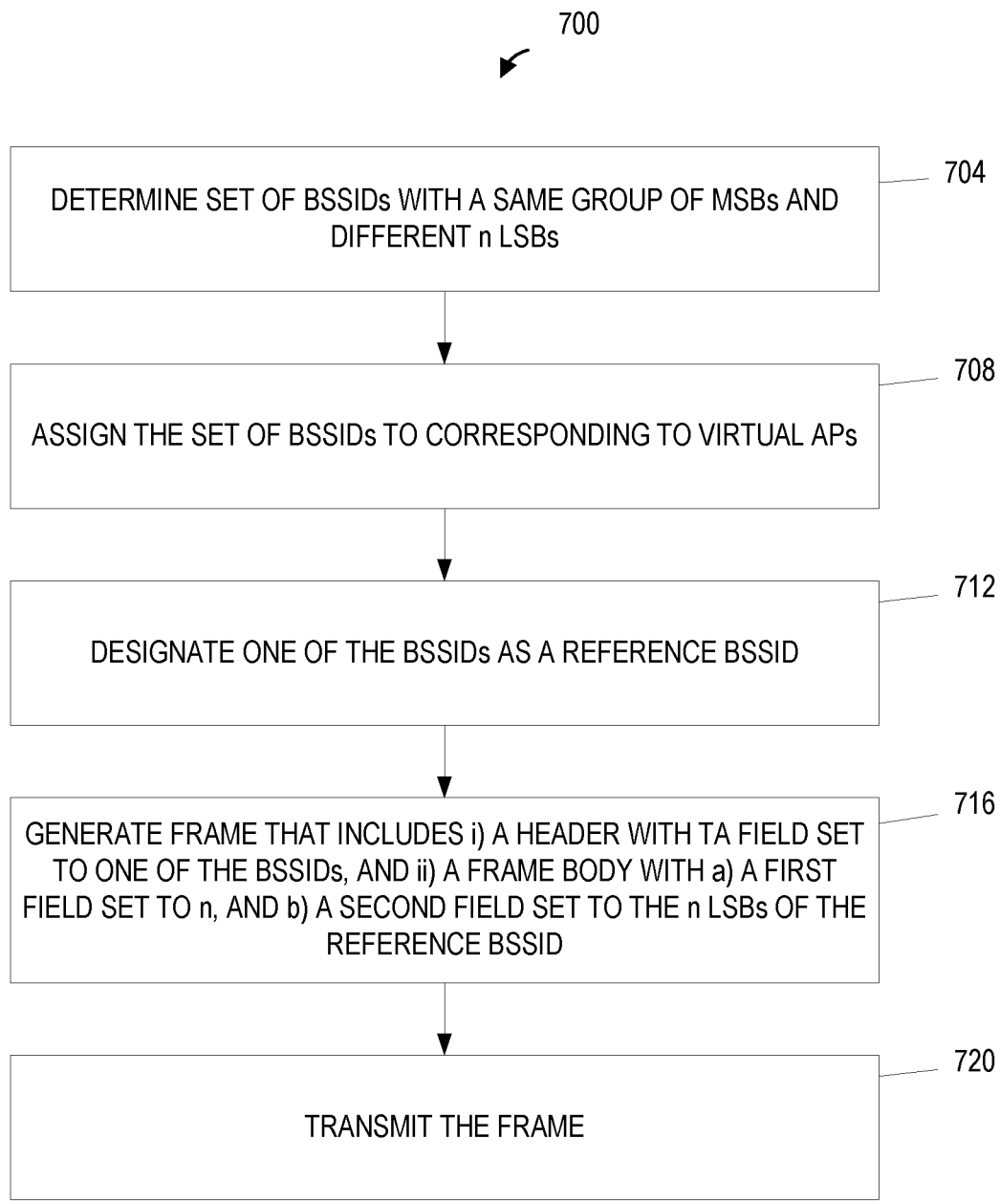
FIG. 7 is a flow diagram of an example method for managing a plurality of network identifiers (e.g., BSSIDs) for a plurality of virtual APs implemented by a physical AP, according to an embodiment.

FIG. 7 is a flow diagram of an example method 700 for managing a plurality of network identifiers (e.g., BSSIDs) for a plurality of virtual APs implemented by a physical AP, according to an embodiment. In an embodiment, the method 700 is implemented by an AP device. With reference to FIG. 1, the method 700 is implemented by the network interface 16, in an embodiment. For example, in one such embodiment, the MAC processor 18 is configured to implement some elements of the method 700, whereas the PHY processor 20 is configured to implement other elements of the method 700. In an embodiment, the host processor 15 is configured to implement some of the elements of the method 700. In other embodiments, the method 700 is implemented by another suitable communication device.

At block 704, a set of network identifiers (e.g., BSSIDs) is determined. Each BSSID in the set includes a same group of most significant bits (MSBs), and each BSSID in the set includes a different group of n least significant bits (LSBs), where n is a positive integer. In an embodiment, each BSSID in the set includes 48 bits, and the same group of MSBs is 48-n bits. In an embodiment, the MAC processor 18 determines the set of BSSIDs. In another embodiment, the host processor 15 determines the set of BSSIDs.

At block 708, respective BSSIDs from the set of BSSIDs are assigned to multiple virtual APs implemented by the AP device. In an embodiment, the MAC processor 18 assigns the BSSIDs to virtual APs. In another embodiment, the host processor 15 assigns the BSSIDs to virtual APs.

At block 712, one of the assigned BSSIDs is designated as a reference BSSID. In an embodiment, the reference BSSID corresponds to a TA for frames intended for client stations associated with more than one virtual AP implemented by the AP device. In an embodiment, the MAC processor 18 designates the one BSSID as the reference BSSID. In another embodiment, the host processor 15 designates the one BSSID as the reference BSSID.

At block 716, a frame is generated, where the frame includes i) a header with a TA field set to one of the assigned BSSIDs, and ii) a frame body with a plurality of fields that includes a) a first field set to n, and b) a second field set to the n LSBs of the reference BSSID. In an embodiment, the frame is a MAC frame, the header is a MAC header, and the frame body is a MAC frame body. In an embodiment, the frame is a management frame. In an embodiment, the frame is a MAC management frame such as a beacon frame, a probe response frame, an association response frame, a reassociation response frame, etc. In an embodiment, the MAC processor 18 generates the frame (e.g., generates a MAC frame, a management frame, a MAC management frame, etc.).

At block 720, the frame generated at block 716 is transmitted. In an embodiment, the method 700 further includes generating a PHY data unit that includes the frame generated at block 716, and block 720 includes transmitting the PHY data unit. In an embodiment, the PHY processor 20 transmits the frame.

In another embodiment, each BSSID in the set of BSSIDs has a first same length; and the TA field, the first field, and the second field, indicate a mapping of BSSIDs in the set of BSSIDs to AIDs, wherein each of the AIDs has a second same length that is shorter than the first same length of the BSSIDs in the set of BSSIDs.

In another embodiment, the method 700 further comprises: generating multiple beacon frames respectively corresponding to the multiple virtual APs, wherein each beacon frame includes a header with a TA field set to the respective BSSID assigned to the respective virtual AP, wherein each beacon frame further includes respective network information regarding a respective basic service set corresponding to the respective virtual AP; and transmitting the multiple beacon frames. In an embodiment, the MAC processor 18 generates the multiple beacon frames, and the PHY processor 20 transmits the multiple beacon frames (e.g., within PHY data units).

In another embodiment, transmitting the multiple beacon frames includes transmitting each beacon frame within a respective physical layer (PHY) data unit having a respective PHY header; each PHY header includes a color field set to a same network identifier; each BSSID in the set of BSSIDs has a first same length; and the same network identifier in each color field of each PHY header has a second length that is shorter than the first same length.

In another embodiment, the method 700 further comprises: generating another frame that includes i) a header with a TA field set to the reference BSSID, and ii) a frame body that includes data for client stations associated with more than one virtual AP implemented by the AP device; and transmitting the other frame. In an embodiment, the MAC processor 18 generates the other frame, and the PHY processor 20 transmits the other frame (e.g., within a PHY data unit). In an embodiment, the method 700 further comprises: allocating a particular RU within an MU PHY data unit for transmitting the other frame; generating RU allocation information to indicate an allocation of RUs with in the MU PHY data unit, wherein the RU allocation information indicates that the particular RU is associated with a station identifier value that is reserved for information corresponding to multiple client station associated with multiple virtual APs; and generating a PHY header of the MU PHY data unit, wherein the PHY header includes the RU allocation information; and wherein transmitting the other frame includes transmitting the other frame within the particular RU within the MU PHY data unit. In an embodiment, the MAC processor 18 allocates the particular RU, and the PHY processor 20 generates the RU allocation information, generates the PHY header, and generates the MU PHY data unit.

In various embodiments, the method 700 includes using one of, or any suitable combination of two or more of, PPDU formats, frame formats, information element formats, field formats, subfield formats, frame exchanges, techniques, etc., discussed in the present application.

Figure 8:
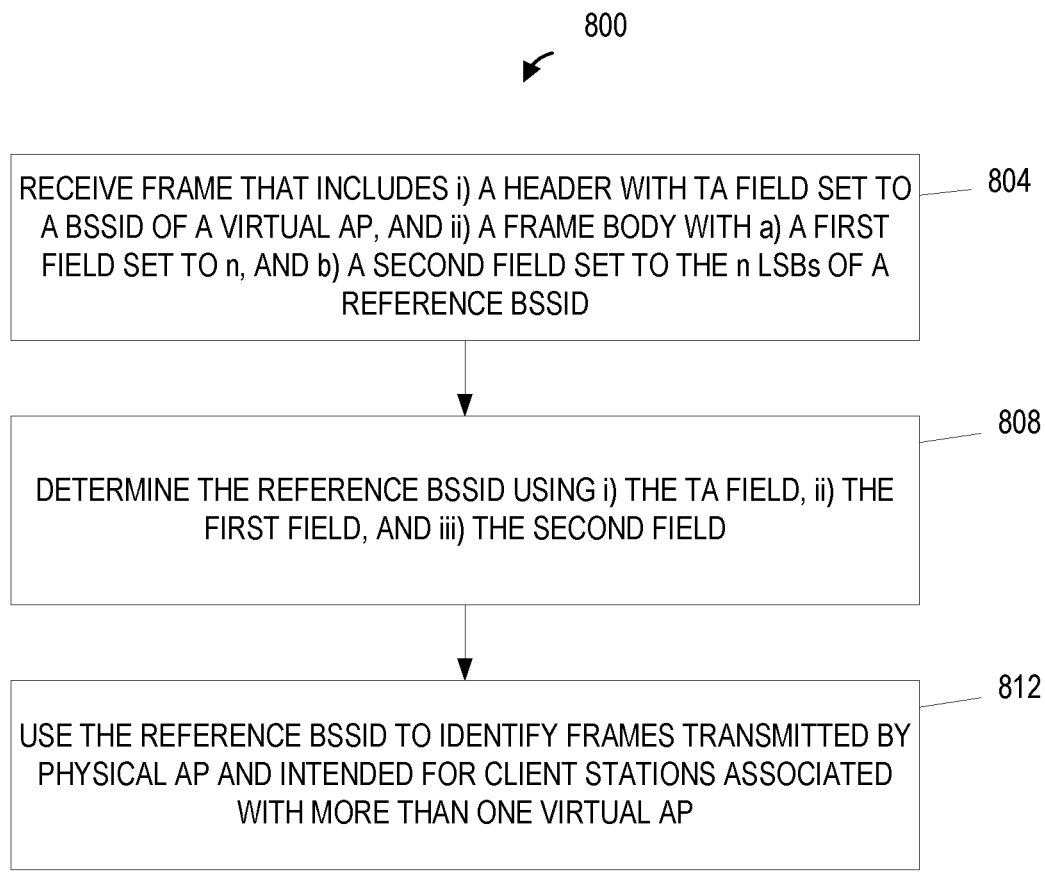
FIG. 8 is a flow diagram of an example method for determining and using network identifier (e.g., BSSID) information corresponding to a plurality of virtual APs implemented by a physical AP, according to an embodiment.

FIG. 8 is a flow diagram of an example method 800 for determining and using network identifier (e.g., BSSID) information corresponding to a plurality of virtual APs implemented by a physical AP, according to an embodiment. In an embodiment, the method 800 is implemented by a client station. With reference to FIG. 1, the method 800 is implemented by the network interface 27, in an embodiment. For example, in one such embodiment, the MAC processor 28 is configured to implement some elements of the method 800, whereas the PHY processor 29 is configured to implement other elements of the method 800. In an embodiment, the host processor 26 is configured to implement some of the elements of the method 800. In other embodiments, the method 800 is implemented by another suitable communication device.

At block 804, a frame (e.g., a management frame) is received from a physical AP device. In an embodiment, the management frame includes i) a header with a TA field set to a particular BSSID corresponding to a particular virtual AP among multiple virtual APs implemented by the physical AP device, and ii) a frame body with a plurality of fields that includes a) a first field set to a value n, and b) a second field set to the n LSBs of a reference BSSID, wherein the reference BSSID corresponds to a TA for frames intended for client stations associated with more than one virtual AP implemented by the AP device.

In an embodiment, the particular BSSID and the reference BSSID are from a set of BSSIDs, wherein each BSSID in the set includes a same group of most significant bits (MSBs), wherein each BSSID in the set includes a different group of n least significant bits (LSBs), wherein n is a positive integer, and wherein respective BSSIDs from the set of BSSIDs correspond to respective virtual APs among the multiple virtual APs implemented by the physical AP device.

In various embodiments, block 804 is implemented by the MAC processor 28 and/or the PHY processor 29. For example, in an embodiment, the frame is included within a PHY data unit; the PHY processor 29 receives the PHY data unit and extracts the frame from the PHY data unit; and the MAC processor 28 receives the frame from the PHY processor 29.

In an embodiment, each BSSID in the set includes 48 bits; and the same group of MSBs is 48-n bits.

In various embodiments, the management frame is one of i) a beacon frame, ii) a probe response frame, iii) or an association response frame.

At block 808, the reference BSSID is determined using i) the TA field, ii) the first field, and iii) the second field. In an embodiment, the MAC processor 28 determines the reference BSSID.

At block 812, frames transmitted by the physical AP device that are intended for client stations associated with more than one virtual AP implemented by the AP device are identified using the determined reference BSSID. In an embodiment, the MAC processor 28 uses the reference BSSID to identify frames transmitted by the physical AP device that are intended for client stations associated with more than one virtual AP implemented by the AP device.

In another embodiment, the method 800 further comprises: receiving another frame that includes a header with a TA field; determining that the TA field is set to the reference BSSID; and determining that a frame body of the other frame includes data for client stations associated with more than one virtual AP implemented by the AP device based on determining that the TA field is set to the reference BSSID. In various embodiments, receiving the other frame is implemented by the MAC processor 28 and/or the PHY processor 29. For example, in an embodiment, the other frame is included within a PHY data unit; the PHY processor 29 receives the PHY data unit and extracts the other frame from the PHY data unit; and the MAC processor 28 receives the other frame from the PHY processor 29. In an embodiment, determining that the TA field is set to the reference BSSID and determining that the frame body of the other frame includes data for client stations associated with more than one virtual AP are implemented by the MAC processor 28.

In an embodiment, the other frame is received within a particular RU within a multi-user (MU) physical layer (PHY) data unit; a PHY header of the MU PHY data unit includes RU allocation information; and the method 800 further comprises: determining that the RU allocation information indicates that the particular RU is associated with a station identifier value that is reserved for information corresponding to multiple client station associated with multiple virtual APs; and determining that the frame body of the other frame includes data for client stations associated with more than one virtual AP implemented by the AP device is further based on determining that the RU allocation information indicates that the particular RU is associated with the station identifier value that is reserved for information corresponding to multiple client station associated with multiple virtual APs.

In various embodiments, the method 800 includes using one of, or any suitable combination of two or more of, PPDU formats, frame formats, information element formats, field formats, subfield formats, frame exchanges, techniques, etc., discussed in the present application.

Embodiment 1: A method, comprising: determining, at an access point (AP) device, a set of basic service set identifiers (BSSIDs), wherein each BSSID in the set includes a same group of most significant bits (MSBs), wherein each BSSID in the set includes a different group of n least significant bits (LSBs), and wherein n is a positive integer; assigning, at the AP device, respective BSSIDs from the set of BSSIDs to multiple virtual APs implemented by the AP device; designating, at the AP device, one of the assigned BSSIDs as a reference BSSID, wherein the reference BSSID corresponds to a transmitter address (TA) for frames intended for client stations associated with more than one virtual AP implemented by the AP device; generating, at the AP device, a management frame that includes i) a header with a TA field set to one of the assigned BSSIDs, and ii) a frame body with a plurality of fields that includes a) a first field set to n, and b) a second field set to the n LSBs of the reference BSSID; and transmitting, by the AP device, the management frame, wherein the TA field, the first field, and the second field, indicate the reference BSSID to a client station that receives the management frame.

Embodiment 2: The method of embodiment 1, wherein: each BSSID in the set includes 48 bits; and the same group of MSBs is 48-n bits.

Embodiment 3: The method of either of embodiments 1 or 2, wherein: each BSSID in the set of BSSIDs has a first same length; and the TA field, the first field, and the second field, indicate a mapping of BSSIDs in the set of BSSIDs to association identifiers (AIDs), wherein each of the AIDs has a second same length that is shorter than the first same length of the BSSIDs in the set of BSSIDs.

Embodiment 4: The method any of embodiments 1-3, further comprising: generating, at the AP device, multiple beacon frames respectively corresponding to the multiple virtual APs, wherein each beacon frame includes a header with a TA field set to the respective BSSID assigned to the respective virtual AP, wherein each beacon frame further includes respective network information regarding a respective basic service set corresponding to the respective virtual AP; and transmitting, by the AP device, the multiple beacon frames.

Embodiment 5: The method embodiment 4, wherein: transmitting the multiple beacon frames includes transmitting each beacon frame within a respective physical layer (PHY) data unit having a respective PHY header; each PHY header includes a color field set to a same network identifier; each BSSID in the set of BSSIDs has a first same length; and the same network identifier in each color field of each PHY header has a second length that is shorter than the first same length.

Embodiment 6: The method of any of embodiments 1-5, wherein: the management frame is one of i) a beacon frame, ii) a probe response frame, iii) or an association response frame.

Embodiment 7: The method of any of embodiments 1-6, further comprising: generating, at the AP device, another frame that includes i) a header with a TA field set to the reference BSSID, and ii) a frame body that includes data for client stations associated with more than one virtual AP implemented by the AP device; and transmitting, by the AP device, the other frame.

Embodiment 8: The method of embodiment 7, further comprising: allocating, at the AP device, a particular resource unit (RU) within a multi-user (MU) physical layer (PHY) data unit for transmitting the other frame; generating, at the AP device, RU allocation information to indicate an allocation of RUs with in the MU PHY data unit, wherein the RU allocation information indicates that the particular RU is associated with a station identifier value that is reserved for information corresponding to multiple client station associated with multiple virtual APs; and generating, at the AP device, a PHY header of the MU PHY data unit, wherein the PHY header includes the RU allocation information; wherein transmitting the other frame includes transmitting the other frame within the particular RU within the MU PHY data unit.

Embodiment 9: An apparatus, comprising: a network interface device associated with an access point (AP) device, wherein the network interface device includes one or more integrated circuit (IC) devices configured to: determine a set of basic service set identifiers (BSSIDs), wherein each BSSID in the set includes a same group of most significant bits (MSBs), wherein each BSSID in the set includes a different group of n least significant bits (LSBs), and wherein n is a positive integer, assign respective BSSIDs from the set of BSSIDs to multiple virtual APs implemented by the AP device, designate one of the assigned BSSIDs as a reference BSSID, wherein the reference BSSID corresponds to a transmitter address (TA) for frames intended for client stations associated with more than one virtual AP implemented by the AP device, generate a management frame that includes i) a header with a TA field set to one of the assigned BSSIDs, and ii) a frame body with a plurality of fields that includes a) a first field set to n, and b) a second field set to the n LSBs of the reference BSSID, and transmit the management frame, wherein the TA field, the first field, and the second field, indicate the reference BSSID to a client station that receives the management frame.

Embodiment 10: The apparatus of embodiment 9, wherein: each BSSID in the set includes 48 bits; and the same group of MSBs is 48-n bits.

Embodiment 11: The apparatus of either of embodiments 9 or 10, wherein: each BSSID in the set of BSSIDs has a first same length; and the TA field, the first field, and the second field, indicate a mapping of BSSIDs in the set of BSSIDs to association identifiers (AIDs), wherein each of the AIDs has a second same length that is shorter than the first same length of the BSSIDs in the set of BSSIDs.

Embodiment 12: The apparatus of any of embodiments 9-11, wherein the one or more IC devices are further configured to: generate multiple beacon frames respectively corresponding to the multiple virtual APs, wherein each beacon frame includes a header with a TA field set to the respective BSSID assigned to the respective virtual AP, wherein each beacon frame further includes respective network information regarding a respective basic service set corresponding to the respective virtual AP; and transmit the multiple beacon frames.

Embodiment 13: The apparatus of embodiment 12, wherein: the one or more IC devices are configured to transmit each beacon frame within a respective physical layer (PHY) data unit having a respective PHY header; each PHY header includes a color field set to a same network identifier; each BSSID in the set of BSSIDs has a first same length; and the same network identifier in each color field of each PHY header has a second length that is shorter than the first same length.

Embodiment 14: The apparatus of any of embodiments 9-13, wherein: the management frame is one of i) a beacon frame, ii) a probe response frame, iii) or an association response frame.

Embodiment 15: The apparatus of any of embodiments 9-14, wherein the one or more IC devices are further configured to: generate another frame that includes i) a header with a TA field set to the reference BSSID, and ii) a frame body that includes data for client stations associated with more than one virtual AP implemented by the AP device; and transmit the other frame.

Embodiment 16: The apparatus of embodiment 15, wherein the one or more IC devices are further configured to: allocate a particular resource unit (RU) within a multi-user (MU) physical layer (PHY) data unit for transmitting the other frame; generate RU allocation information to indicate an allocation of RUs with in the MU PHY data unit, wherein the RU allocation information indicates that the particular RU is associated with a station identifier value that is reserved for information corresponding to multiple client station associated with multiple virtual APs; generate, a PHY header of the MU PHY data unit, wherein the PHY header includes the RU allocation information; and transmit the other frame within the particular RU within the MU PHY data unit.

Embodiment 17: A method, comprising: receiving, at a particular client station, a management frame from a physical access point (AP) device, wherein the management frame includes i) a header with a transmitter address (TA) field set to a particular basic service set identifier (BSSID) corresponding to a particular virtual AP among multiple virtual APs implemented by the physical AP device, and ii) a frame body with a plurality of fields that includes a) a first field set to a value n, and b) a second field set to the n LSBs of a reference BSSID, wherein the reference BSSID corresponds to a TA for frames intended for client stations associated with more than one virtual AP implemented by the AP device; wherein the particular BSSID and the reference BSSID are from a set of BSSIDs, wherein each BSSID in the set includes a same group of most significant bits (MSBs), wherein each BSSID in the set includes a different group of n least significant bits (LSBs), wherein n is a positive integer, and wherein respective BSSIDs from the set of BSSIDs correspond to respective virtual APs among the multiple virtual APs implemented by the physical AP device; determining, at the particular client station, the reference BSSID using i) the TA field, ii) the first field, and iii) the second field; and using, at the particular client station, the determined reference BSSID to identify frames transmitted by the physical AP device that are intended for client stations associated with more than one virtual AP implemented by the AP device.

Embodiment 18: The method of embodiment 17, wherein: each BSSID in the set includes 48 bits; and the same group of MSBs is 48-n bits.

Embodiment 19: The method of either of embodiments 17 or 18, wherein: the management frame is one of i) a beacon frame, ii) a probe response frame, iii) or an association response frame.

Embodiment 20: The method of any of embodiments 17-19, further comprising: receiving, at the particular client station, another frame that includes a header with a TA field; determining, at the particular client station, that the TA field is set to the reference BSSID; and determining, at the particular client station, that a frame body of the other frame includes data for client stations associated with more than one virtual AP implemented by the AP device based on determining that the TA field is set to the reference BSSID.

Embodiment 21: The method of embodiment 20, wherein: receiving the other frame includes receiving the other frame within a particular resource unit (RU) within a multi-user (MU) physical layer (PHY) data unit; a PHY header of the MU PHY data unit includes RU allocation information; the method further comprises: determining, at the particular client station, that the RU allocation information indicates that the particular RU is associated with a station identifier value that is reserved for information corresponding to multiple client station associated with multiple virtual APs; and determining that the frame body of the other frame includes data for client stations associated with more than one virtual AP implemented by the AP device is further based on determining that the RU allocation information indicates that the particular RU is associated with the station identifier value that is reserved for information corresponding to multiple client station associated with multiple virtual APs.

Embodiment 22: An apparatus, comprising: a network interface device associated with a particular client station, wherein the network interface device includes one or more integrated circuit (IC) devices configured to: receive a management frame from a physical access point (AP) device, wherein the management frame includes i) a header with a transmitter address (TA) field set to a particular basic service set identifier (BSSID) corresponding to a particular virtual AP among multiple virtual APs implemented by the physical AP device, and ii) a frame body with a plurality of fields that includes a) a first field set to a value n, and b) a second field set to the n LSBs of a reference BSSID, wherein the reference BSSID corresponds to a TA for frames intended for client stations associated with more than one virtual AP implemented by the AP device; wherein the particular BSSID and the reference BSSID are from a set of BSSIDs, wherein each BSSID in the set includes a same group of most significant bits (MSBs), wherein each BSSID in the set includes a different group of n least significant bits (LSBs), wherein n is a positive integer, and wherein respective BSSIDs from the set of BSSIDs correspond to respective virtual APs among the multiple virtual APs implemented by the physical AP device; wherein the one or more IC devices are further configured to: determine the reference BSSID using i) the TA field, ii) the first field, and iii) the second field, and use the determined reference BSSID to identify frames transmitted by the physical AP device that are intended for client stations associated with more than one virtual AP implemented by the AP device.

Embodiment 23: The apparatus of embodiment 22, wherein: each BSSID in the set includes 48 bits; and the same group of MSBs is 48-n bits.

Embodiment 24: The apparatus of either of embodiments 22 or 23, wherein: the management frame is one of i) a beacon frame, ii) a probe response frame, iii) or an association response frame.

Embodiment 25: The apparatus of any of embodiments 22-24, wherein the one or more IC devices are further configured to: receive another frame that includes a header with a TA field; determine that the TA field is set to the reference BSSID; and determine that a frame body of the other frame includes data for client stations associated with more than one virtual AP implemented by the AP device based on determining that the TA field is set to the reference BSSID.

Embodiment 26: The apparatus of embodiment 25, wherein: the other frame is received within a particular resource unit (RU) within a multi-user (MU) physical layer (PHY) data unit; a PHY header of the MU PHY data unit includes RU allocation information; the one or more IC devices are further configured to: determine that the RU allocation information indicates that the particular RU is associated with a station identifier value that is reserved for information corresponding to multiple client station associated with multiple virtual APs, and determine that the frame body of the other frame includes data for client stations associated with more than one virtual AP implemented by the AP device further based on determining that the RU allocation information indicates that the particular RU is associated with the station identifier value that is reserved for information corresponding to multiple client station associated with multiple virtual APs.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
   determining, at an access point (AP) device, a set of basic service set identifiers (BSSIDs), wherein each BSSID in the set includes a same group of most significant bits (MSBs), wherein each BSSID in the set includes a different group of n least significant bits (LSBs), and wherein n is a positive integer;
   assigning, at the AP device, respective BSSIDs from the set of BSSIDs to multiple virtual APs implemented by the AP device;
   designating, at the AP device, one of the assigned BSSIDs as a reference BSSID, wherein the reference BSSID corresponds to a transmitter address (TA) for frames intended for client stations associated with more than one virtual AP implemented by the AP device;
   generating, at the AP device, a management frame that includes i) a header with a TA field set to one of the assigned BSSIDs, and ii) a frame body with a plurality of fields that includes a) a first field set to n, and b) a second field set to the n LSBs of the reference BSSID; and
   transmitting, by the AP device, the management frame, wherein the TA field, the first field, and the second field, indicate the reference BSSID to a client station that receives the management frame.

2. The method of claim 1, wherein:
   each BSSID in the set includes 48 bits; and
   the same group of MSBs is 48-n bits.

3. The method of claim 1, wherein:
   each BSSID in the set of BSSIDs has a first same length; and
   the TA field, the first field, and the second field, indicate a mapping of BSSIDs in the set of BSSIDs to association identifiers (AIDs), wherein each of the AIDs has a second same length that is shorter than the first same length of the BSSIDs in the set of BSSIDs.

4. The method claim 1, further comprising:
   generating, at the AP device, multiple beacon frames respectively corresponding to the multiple virtual APs, wherein each beacon frame includes a header with a TA field set to the respective BSSID assigned to the respective virtual AP, wherein each beacon frame further includes respective network information regarding a respective basic service set corresponding to the respective virtual AP; and
   transmitting, by the AP device, the multiple beacon frames.

5. The method claim 4, wherein:
   transmitting the multiple beacon frames includes transmitting each beacon frame within a respective physical layer (PHY) data unit having a respective PHY header;
   each PHY header includes a color field set to a same network identifier;
   each BSSID in the set of BSSIDs has a first same length; and
   the same network identifier in each color field of each PHY header has a second length that is shorter than the first same length.

6. The method of claim 1, wherein:
   the management frame is one of i) a beacon frame, ii) a probe response frame, iii) or an association response frame.

7. The method of claim 1, further comprising:
   generating, at the AP device, another frame that includes i) a header with a TA field set to the reference BSSID, and ii) a frame body that includes data for more than one client station associated with more than one virtual AP implemented by the AP device; and
   transmitting, by the AP device, the other frame.

8. The method of claim 7, further comprising:
allocating, at the AP device, a particular resource unit (RU) within a multi-user (MU) physical layer (PHY) data unit for transmitting the other frame;
generating, at the AP device, RU allocation information to indicate an allocation of RUs within the MU PHY data unit, wherein the RU allocation information indicates that the particular RU is associated with a station identifier value that is reserved for information corresponding to the multiple client stations associated with the multiple virtual APs; and
generating, at the AP device, a PHY header of the MU PHY data unit, wherein the PHY header includes the RU allocation information;
wherein transmitting the other frame includes transmitting the other frame within the particular RU within the MU PHY data unit.

9. An apparatus, comprising:
a network interface device associated with an access point (AP) device, wherein the network interface device includes one or more integrated circuit (IC) devices configured to:
determine a set of basic service set identifiers (BSSIDs), wherein each BSSID in the set includes a same group of most significant bits (MSBs), wherein each BSSID in the set includes a different group of n least significant bits (LSBs), and wherein n is a positive integer,
assign respective BSSIDs from the set of BSSIDs to multiple virtual APs implemented by the AP device,
designate one of the assigned BSSIDs as a reference BSSID, wherein the reference BSSID corresponds to a transmitter address (TA) for frames intended for client stations associated with more than one virtual AP implemented by the AP device,
generate a management frame that includes i) a header with a TA field set to one of the assigned BSSIDs, and ii) a frame body with a plurality of fields that includes a) a first field set to n, and b) a second field set to the n LSBs of the reference BSSID, and
transmit the management frame, wherein the TA field, the first field, and the second field, indicate the reference BSSID to a client station that receives the management frame.

10. The apparatus of claim 9, wherein:
each BSSID in the set includes 48 bits; and
the same group of MSBs is 48-n bits.

11. The apparatus of claim 9, wherein:
each BSSID in the set of BSSIDs has a first same length; and
the TA field, the first field, and the second field, indicate a mapping of BSSIDs in the set of BSSIDs to association identifiers (AIDs), wherein each of the AIDs has a second same length that is shorter than the first same length of the BSSIDs in the set of BSSIDs.

12. The apparatus of claim 9, wherein the one or more IC devices are further configured to:
generate multiple beacon frames respectively corresponding to the multiple virtual APs, wherein each beacon frame includes a header with a TA field set to the respective BSSID assigned to the respective virtual AP, wherein each beacon frame further includes respective network information regarding a respective basic service set corresponding to the respective virtual AP; and
transmit the multiple beacon frames.

13. The apparatus of claim 12, wherein:
the one or more IC devices are configured to transmit each beacon frame within a respective physical layer (PHY) data unit having a respective PHY header;
each PHY header includes a color field set to a same network identifier;
each BSSID in the set of BSSIDs has a first same length; and
the same network identifier in each color field of each PHY header has a second length that is shorter than the first same length.

14. The apparatus of claim 9, wherein:
the management frame is one of i) a beacon frame, ii) a probe response frame, iii) or an association response frame.

15. The apparatus of claim 9, wherein the one or more IC devices are further configured to:
generate another frame that includes i) a header with a TA field set to the reference BSSID, and ii) a frame body that includes data for more than one client station associated with more than one virtual AP implemented by the AP device; and
transmit the other frame.

16. The apparatus of claim 15, wherein the one or more IC devices are further configured to:
allocate a particular resource unit (RU) within a multi-user (MU) physical layer (PHY) data unit for transmitting the other frame;
generate RU allocation information to indicate an allocation of RUs within the MU PHY data unit, wherein the RU allocation information indicates that the particular RU is associated with a station identifier value that is reserved for information corresponding to the multiple client stations associated with the multiple virtual APs;
generate, a PHY header of the MU PHY data unit, wherein the PHY header includes the RU allocation information; and
transmit the other frame within the particular RU within the MU PHY data unit.

17. A method, comprising:
receiving, at a particular client station, a management frame from a physical access point (AP) device, wherein the management frame includes i) a header with a transmitter address (TA) field set to a particular basic service set identifier (BSSID) corresponding to a particular virtual AP among multiple virtual APs implemented by the physical AP device, and ii) a frame body with a plurality of fields that includes a) a first field set to a value n, and b) a second field set to the n LSBs of a reference BSSID, wherein the reference BSSID corresponds to a TA for frames intended for client stations associated with more than one virtual AP implemented by the AP device;
wherein the particular BSSID and the reference BSSID are from a set of BSSIDs, wherein each BSSID in the set includes a same group of most significant bits (MSBs), wherein each BSSID in the set includes a different group of n least significant bits (LSBs), wherein n is a positive integer, and wherein respective BSSIDs from the set of BSSIDs correspond to respective virtual APs among the multiple virtual APs implemented by the physical AP device;
determining, at the particular client station, the reference BSSID using i) the TA field, ii) the first field, and iii) the second field; and
using, at the particular client station, the determined reference BSSID to identify frames transmitted by the physical AP device that are intended for more than one client station associated with more than one virtual AP implemented by the AP device.

18. The method of claim 17, wherein:
each BSSID in the set includes 48 bits; and
the same group of MSBs is 48-n bits.

19. The method of claim 17, wherein:
the management frame is one of i) a beacon frame, ii) a probe response frame, iii) or an association response frame.

20. The method of claim 17, further comprising:
receiving, at the particular client station, another frame that includes a header with a TA field;
determining, at the particular client station, that the TA field is set to the reference BSSID; and
determining, at the particular client station, that a frame body of the other frame includes data for more than one client station associated with more than one virtual AP implemented by the AP device based on determining that the TA field is set to the reference BSSID.

21. The method of claim 20, wherein:
receiving the other frame includes receiving the other frame within a particular resource unit (RU) within a multi-user (MU) physical layer (PHY) data unit;
a PHY header of the MU PHY data unit includes RU allocation information;
the method further comprises: determining, at the particular client station, that the RU allocation information indicates that the particular RU is associated with a station identifier value that is reserved for information corresponding to multiple client station associated with multiple virtual APs; and
determining that the frame body of the other frame includes data for more than one client station associated with more than one virtual AP implemented by the AP device is further based on determining that the RU allocation information indicates that the particular RU is associated with the station identifier value that is reserved for information corresponding to multiple client station associated with multiple virtual APs.

22. An apparatus, comprising:
a network interface device associated with a particular client station, wherein the network interface device includes one or more integrated circuit (IC) devices configured to:
receive a management frame from a physical access point (AP) device, wherein the management frame includes i) a header with a transmitter address (TA) field set to a particular basic service set identifier (BSSID) corresponding to a particular virtual AP among multiple virtual APs implemented by the physical AP device, and ii) a frame body with a plurality of fields that includes a) a first field set to a value n, and b) a second field set to the n LSBs of a reference BSSID, wherein the reference BSSID corresponds to a TA for frames intended for client stations associated with more than one virtual AP implemented by the AP device;
wherein the particular BSSID and the reference BSSID are from a set of BSSIDs, wherein each BSSID in the set includes a same group of most significant bits (MSBs), wherein each BSSID in the set includes a different group of n least significant bits (LSBs), wherein n is a positive integer, and wherein respective BSSIDs from the set of BSSIDs correspond to respective virtual APs among the multiple virtual APs implemented by the physical AP device;
wherein the one or more IC devices are further configured to:
determine the reference BSSID using i) the TA field, ii) the first field, and iii) the second field, and
use the determined reference BSSID to identify frames transmitted by the physical AP device that are intended for client stations associated with more than one virtual AP implemented by the AP device.

23. The apparatus of claim 22, wherein:
each BSSID in the set includes 48 bits; and
the same group of MSBs is 48-n bits.

24. The apparatus of claim 22, wherein:
the management frame is one of i) a beacon frame, ii) a probe response frame, iii) or an association response frame.

25. The apparatus of claim 22, wherein the one or more IC devices are further configured to:
receive another frame that includes a header with a TA field;
determine that the TA field is set to the reference BSSID; and
determine that a frame body of the other frame includes data for more than one client station associated with more than one virtual AP implemented by the AP device based on determining that the TA field is set to the reference BSSID.

26. The apparatus of claim 25, wherein:
the other frame is received within a particular resource unit (RU) within a multi-user (MU) physical layer (PHY) data unit;
a PHY header of the MU PHY data unit includes RU allocation information;
the one or more IC devices are further configured to:
determine that the RU allocation information indicates that the particular RU is associated with a station identifier value that is reserved for information corresponding to multiple client station associated with multiple virtual APs, and
determine that the frame body of the other frame includes data for more than one client station associated with more than one virtual AP implemented by the AP device further based on determining that the RU allocation information indicates that the particular RU is associated with the station identifier value that is reserved for information corresponding to multiple client stations associated with the multiple virtual APs.

* * * * *